(12) United States Patent
Yoshida

(10) Patent No.: US 8,321,894 B2
(45) Date of Patent: Nov. 27, 2012

(54) TRANSMISSION APPARATUS, RECEPTION APPARATUS

(75) Inventor: Naoki Yoshida, Tokyo (JP)

(73) Assignee: Sony Corporation (JP)

(*) Notice: Subject to any disclaimer, the term of this patent is extended or adjusted under 35 U.S.C. 154(b) by 976 days.

(21) Appl. No.: 10/518,783

(22) PCT Filed: Jun. 20, 2003

(86) PCT No.: PCT/JP03/07873
§ 371 (c)(1),
(2), (4) Date: Dec. 20, 2004

(87) PCT Pub. No.: WO04/002158
PCT Pub. Date: Dec. 31, 2003

(65) Prior Publication Data
US 2005/0246759 A1      Nov. 3, 2005

(30) Foreign Application Priority Data

Jun. 21, 2002  (JP) ............................ P2002-182020
Jun. 21, 2002  (JP) ............................ P2002-182021

(51) Int. Cl.
*H04N 5/445* (2011.01)
(52) U.S. Cl. .............. 725/54; 725/14; 725/46; 725/136; 725/142
(58) Field of Classification Search .............. 725/54, 725/14, 46, 136, 142
See application file for complete search history.

(56) References Cited

U.S. PATENT DOCUMENTS

| | | | |
|---|---|---|---|
| 6,404,446 B1 * | 6/2002 | Bates et al. ............... | 715/854 |
| 6,760,916 B2 * | 7/2004 | Holtz et al. ............... | 725/34 |
| 6,765,557 B1 * | 7/2004 | Segal et al. ............... | 345/173 |
| 2002/0073425 A1 | 6/2002 | Arai et al. | |
| 2002/0138830 A1 * | 9/2002 | Nagaoka et al. ............... | 725/14 |
| 2004/0010806 A1 * | 1/2004 | Yuen et al. ............... | 725/136 |
| 2005/0193414 A1 * | 9/2005 | Horvitz et al. ............... | 725/46 |

FOREIGN PATENT DOCUMENTS

| | | |
|---|---|---|
| EP | 1 096 797 A1 | 5/2001 |
| GB | 2 349 267 A | 10/2000 |
| JP | 09-046663 | 2/1997 |
| JP | 09-046713 | 2/1997 |
| JP | 10-313449 | 11/1998 |
| JP | 11-103452 | 4/1999 |
| JP | 11-187324 A | 7/1999 |

(Continued)

*Primary Examiner* — Nasser Goodarzi
*Assistant Examiner* — Jivka Rabovianski
(74) *Attorney, Agent, or Firm* — Lerner, David, Littenberg, Krumholz & Mentlik, LLP

(57) ABSTRACT

A transmission apparatus and a reception apparatus have improved characteristics such as entertainment and convenience for a user who receives content received by a digital satellite broadcast receiver. A broadcasting side, along with a first content (video/audio content), broadcasts content (second content) as data for forming a GUI related to a broadcast content as the video/audio signal. A reception apparatus side receiving the content executes a process for outputting a GUI together with a picture of the first content in accordance with the description in a script of the second content. Further, a process is executed to generate use history information in accordance with the user's use of the first content in the reception apparatus and to change the content of a service provided on the GUI based on the use history information. According to this structure, the service content provided on the GUI varies in accordance with the operation and behavior of the user in response to a screen picture/audio of the first content.

18 Claims, 18 Drawing Sheets

FOREIGN PATENT DOCUMENTS

| | | |
|---|---|---|
| JP | 11-261908 A | 9/1999 |
| JP | 11-284968 A | 10/1999 |
| JP | 11-327717 | 11/1999 |
| JP | 2000-032403 A | 1/2000 |
| JP | 2000-172394 A | 6/2000 |
| JP | 2000-285660 A | 10/2000 |
| JP | 2000-308038 A | 11/2000 |
| JP | 2000-324472 A | 11/2000 |
| JP | 2000-333041 A | 11/2000 |
| JP | 2000-333043 A | 11/2000 |
| JP | 2001-024995 A | 1/2001 |
| JP | 2001-251602 A | 9/2001 |
| JP | 2001-274757 A | 10/2001 |
| JP | 2002-112186 A | 4/2002 |
| JP | 2002-170026 | 6/2002 |
| WO | 96/29701 A1 | 9/1996 |

\* cited by examiner

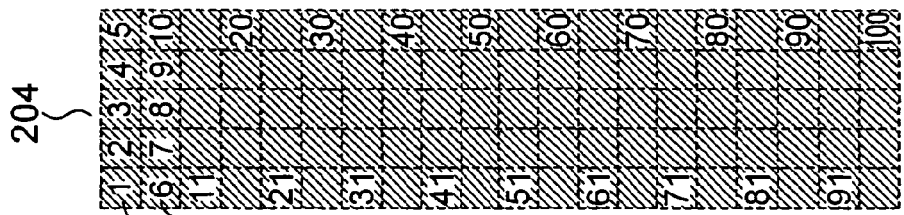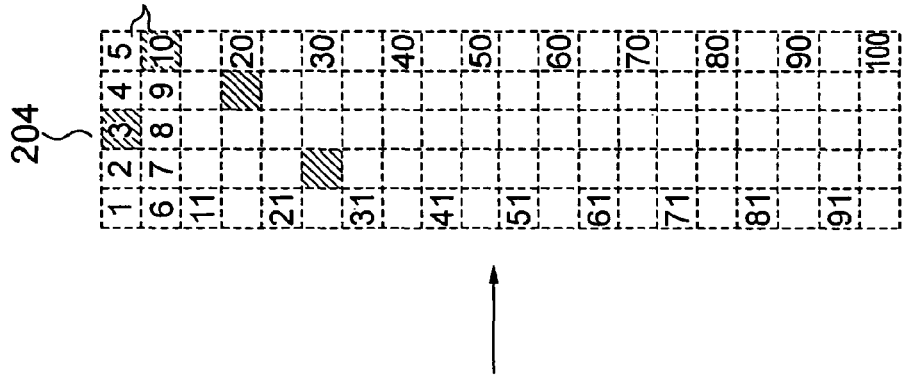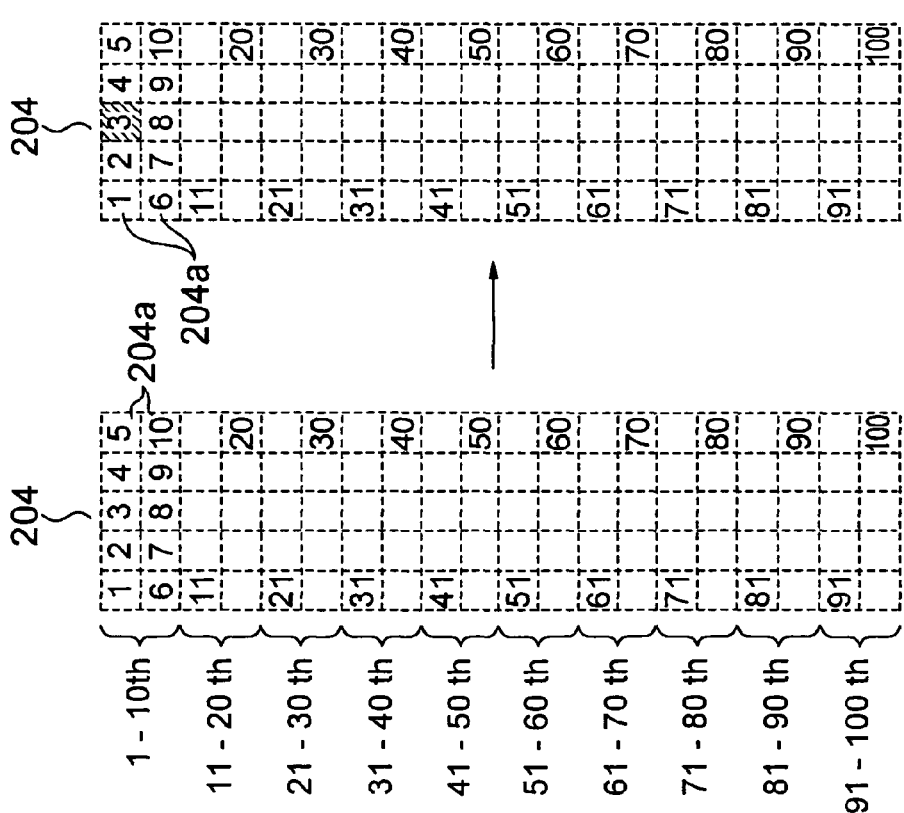

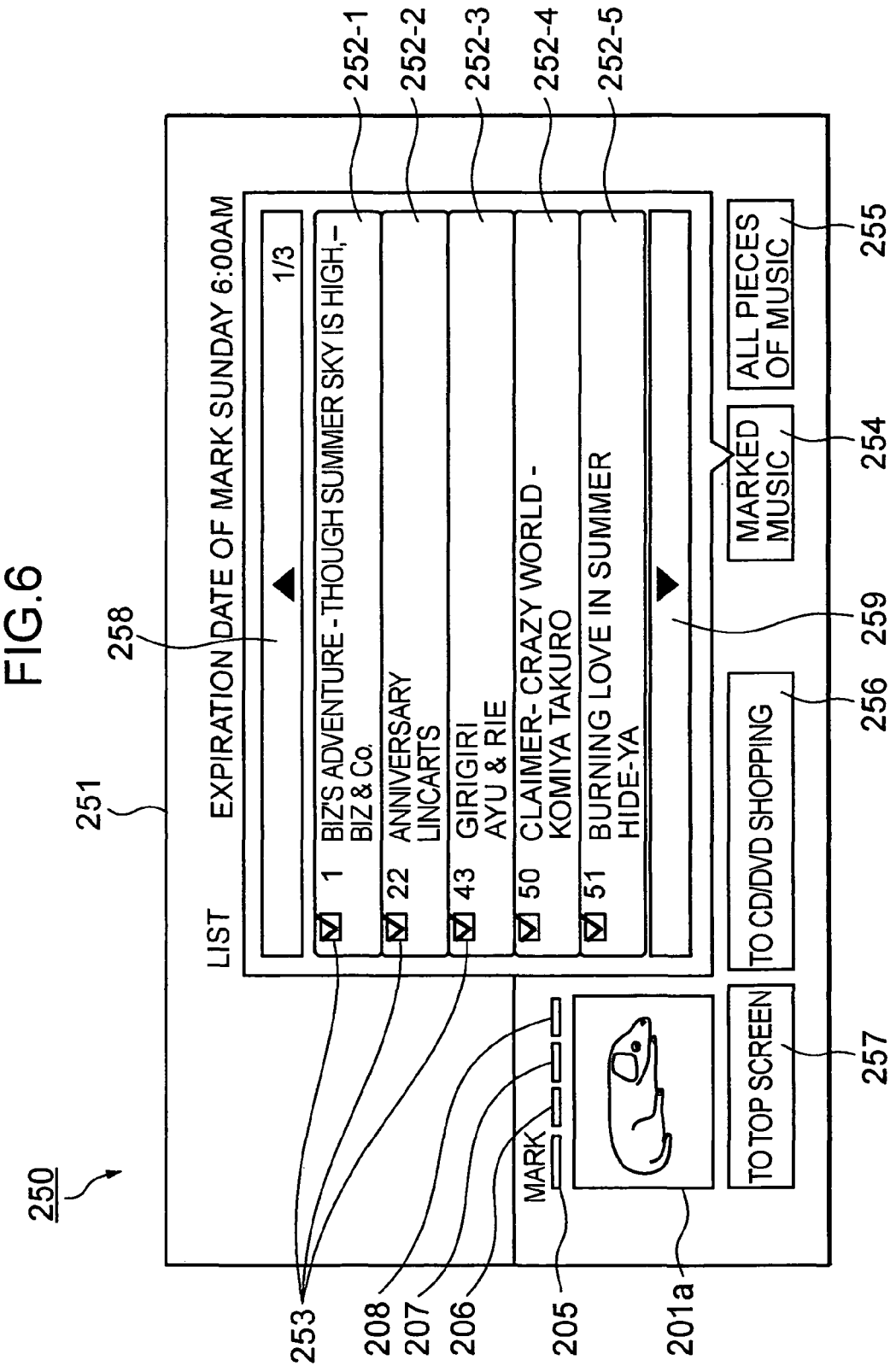

FIG.12

| RANKING ORDER | CONTENT ID | THE NUMBER OF TIMES OF VIEWING |
|---|---|---|
| 1 | xxxxh | 10 |
| 2 | xxxxh | 0 |
| 3 | xxxxh | 3 |
| 4 | xxxxh | 4 |
| 98 | xxxxh | 0 |
| 99 | xxxxh | 6 |
| 100 | xxxxh | 0 |

FIG.13

| RANKING ORDER | CONTENT ID | MARK BIT |
|---|---|---|
| 1 | xxxxh | 1 (ON) |
| 2 | xxxxh | 0 (OFF) |
| 3 | xxxxh | 0 |
| 4 | xxxxh | 1 |
| 98 | xxxxh | 0 |
| 99 | xxxxh | 1 |
| 100 | xxxxh | 0 |

| 1 | SERVICE ID | USE DATE |
|---|---|---|
| 2 | SERVICE ID | USE DATE |
| 3 | SERVICE ID | USE DATE |
| 7 | SERVICE ID | USE DATE |
| 8 | SERVICE ID | USE DATE |

TRANSMISSION APPARATUS, RECEPTION APPARATUS

BACKGROUND OF THE INVENTION

1. Field of the Invention

The present application relates to a transmission apparatus for transmitting broadcast content and a reception apparatus capable of receiving the broadcast content transmitted by the transmission apparatus.

2. Background Art

Recently, digital satellite broadcasts have become widespread. The digital satellite broadcast can transmit a high quality signal because of higher resistance to noise or fading compared to, for example, existing analog broadcasting. Further, a digital satellite broadcast can improve frequency utilization and can promote multi-channel systems. More specifically, a digital satellite broadcast with one satellite can provide hundreds of channels.

Further, in a digital satellite broadcast, broadcasting of data content is carried out by a data broadcasting service in addition to, for example, content of video (moving picture)/audio as a general program.

The data broadcasting service can provide, for example, information for services such as stock prices, weather forecasts, various commercial messages, or the like and is displayed by superimposing the information on a picture of the usual programs.

In view of the above, it can be said that the situation also allows, as broadcast content broadcast by the digital satellite broadcast, data content to be delivered along with the video/audio content as existent general programs.

However, currently data broadcasting provides various types of information by displaying characters or a picture superimposed on pictures displayed as the general program.

Thus, there is room for improvement in conventional digital satellite broadcasting with respect to convenience of operation, or in allowing users, who are enjoying the content received by digital satellite broadcast receivers, have more fun, by using data contents in a more efficient manner compared to conventional techniques.

SUMMARY OF THE INVENTION

In consideration of the above-described drawbacks, the present application discloses a transmission apparatus as follows:

First production means is provided for producing a first content of a video signal and/or an audio signal.

Further, there is provided second production means for producing a second content, corresponding to the first content, the second content including a script for outputting a graphical user interface, the script including a description for causing a reception apparatus to execute a process for producing use history information including a predetermined content in accordance with a use result related to the use by a user of the first content in the reception apparatus and a process for changing the graphical user interface so as to change a service to be provided with an operation to a user interface screen picture, based on the use history information.

Further, there is provided sending means for providing, as a broadcast, a transmission output of the second content combined with the first content.

Furthermore, the present application discloses a reception apparatus as follows:

There is provided reception means capable of receiving a first content of a video signal and/or an audio signal transmitted as a broadcast and a second content, corresponding to the first content, the second content including a script for outputting a graphical user interface, the script including a description for causing the reception apparatus to execute a process for producing use history information including a predetermined content in accordance with a result of use by a user related to the first content in the reception apparatus, and a process for changing the graphical user interface so as to change a service to be provided with the operation to a user interface screen picture, based on the use history information.

Further, there is provided user interface forming means for forming a graphical user interface to be output together with a picture as the first content in accordance with the script, for producing and storing the use history information in accordance with the use result, and for executing, in accordance with a description of the script, a process for changing the graphical user interface based on the use history information so as to change the service to be provided with the operation to the user interface screen picture.

According to the above-mentioned respective structures, content (second content) is broadcast as data for forming a GUI (Graphical User Interface) regarding the broadcast content as this video/audio signal in combination with the broadcast content (first content) corresponding to the general broadcast program content of the video/audio signal.

Further, the reception apparatus side receiving the content executes a process to output the GUI together with the screen picture of a first content in accordance with the description of the script. Further, in accordance with the description of the script, the use history information is produced and stored in accordance with the use result of the reception apparatus by the user. Further, based on the use history information, a process is executed to change the content of the service provided on the GUI screen picture. In accordance with this structure, the service content provided in the GUI is changed in accordance with the user's operation or behavior in response to a picture/audio output of the first content.

Further, this change of the GUI is obtained by a process in accordance with the script. In other words, the process concluded within the reception apparatus provides a change of the GUI adaptive to a change in the content of the first content.

More specifically, there is provided first production means for producing a first content of a video signal and/or the audio signal.

Further, there is provided second production means for producing a second content, corresponding to the first content, the second content including a for outputting a graphical user interface, the script including a description for causing the reception apparatus to execute a process for changing a picture content in the graphical user interface in accordance with the change in the content of the first content.

Further, there is provided sending means for providing, as a broadcast, a transmission output of the second content combined with the first content.

Further, the present application discloses a reception apparatus as follows:

There is provided reception means capable of receiving a first content including a video signal and/or an audio signal transmitted as a broadcast and a second content, corresponding to the first content, the second content including a script for outputting a graphical interface, the script including a description for causing the reception apparatus to execute a process for changing a picture content in the graphical user interface in accordance with the change in the content of the first content.

Further, there is provided interface forming means for forming a graphical user interface so as to change the picture content in accordance with a change in the content of the first content in accordance with a description of script and for forming the user interface picture to be output together with a picture as the first content in accordance with the script of the second contents received by the reception means.

According to the above-mentioned structures, together with the broadcast content (first content) corresponding to the general broadcast program content using the video/audio signal (first content), a content (second content) is broadcast as data for forming the GUI (Graphical User Interface) related to the broadcast content as the video/audio signal.

Further, the reception apparatus side receiving the content executes a process to display the GUI screen picture together with the picture of the first content in accordance with the description of the script and a process for changing the display content of the GUI screen picture in accordance with the change in the content of the first content. In other words, according to the present invention, for example, added-value information to be displayed on the GUI screen picture regarding the first content adaptively changes in response to the change in the content of the first content.

Further, such a change in the GUI is obtained by the process according to the script as the second content. More specifically, the process concluded within the reception apparatus can give the adaptive change of the GUI in response to a change in the content of the first content.

Further, the present application discloses a transmission apparatus as follows:

There is provided a first production means for producing a first content of a video signal and/or an audio signal.

Further, there is provided second production means for producing a second content, corresponding to the first content and formed with a script for outputting a graphical user interface, the script including a description for causing the reception apparatus to execute a process for producing use history information including a predetermined content in accordance with the use result by a user of the reception apparatus related to the first content and a process for making a change in the picture content in the graphical user interface based on the use history information.

Further, there is provided sending means for providing, as a broadcast, a transmission output of the second content in combination with the first content.

Further, the present application discloses a reception apparatus as follows:

There is provided reception means capable of receiving the second content including a script for causing the reception apparatus to execute a process for producing a first content of a video signal and/or an audio signal transmitted as a broadcast and use history information of a predetermined content in accordance with the use result of the reception apparatus regarding the first content by the user and for outputting a graphical user interface and a process for obtaining a change of the picture content on the graphical user interface on the basis of the use history information.

Further, there is provided interface forming means capable of forming the graphical user interface to be output with a picture as a first content in accordance with the script, producing and storing use history information according to the use result of the reception apparatus by a user, and forming the graphical user interface to change the picture content based on the stored use history information.

According to the above-mentioned structure, the content (second content) as data for forming the GUI related to the broadcast content as the video/audio signal is broadcast together with the broadcast content (first content) corresponding to the general broadcasting content using the video/audio signal.

The reception apparatus side receiving the content executes a process for displaying the GUI screen picture together with the picture of the first content in accordance with the description of the script of the second content. Further, in accordance with the description of the script, use history information is prepared and stored in accordance with use by a user of the first content in the reception apparatus. Then, based on the use history information, the process is executed for changing the display content of the GUI.

According to this structure, the display content of the GUI screen picture changes in accordance with the operation or behavior of the user responding to viewing the first contents of picture/audio.

The above-mentioned change of the GUI is obtained by the process in accordance with the script included in the second content. In other words, the process concluded within the reception apparatus can provide a change in the GUI, which is adaptive upon the switching of the first content.

BRIEF DESCRIPTION OF THE DRAWINGS

FIGS. 5A to 5D are illustrations showing an example of display transition on a cell display for a music gauge area.

FIG. 6 is an illustration showing an example of a display condition representing a list screen picture of the marked music.

FIG. 12 is an illustration showing a structural example of a PV viewing history information.

FIG. 13 is an illustration showing a structural example of mark information.

DETAILED DESCRIPTION

Figure 1:
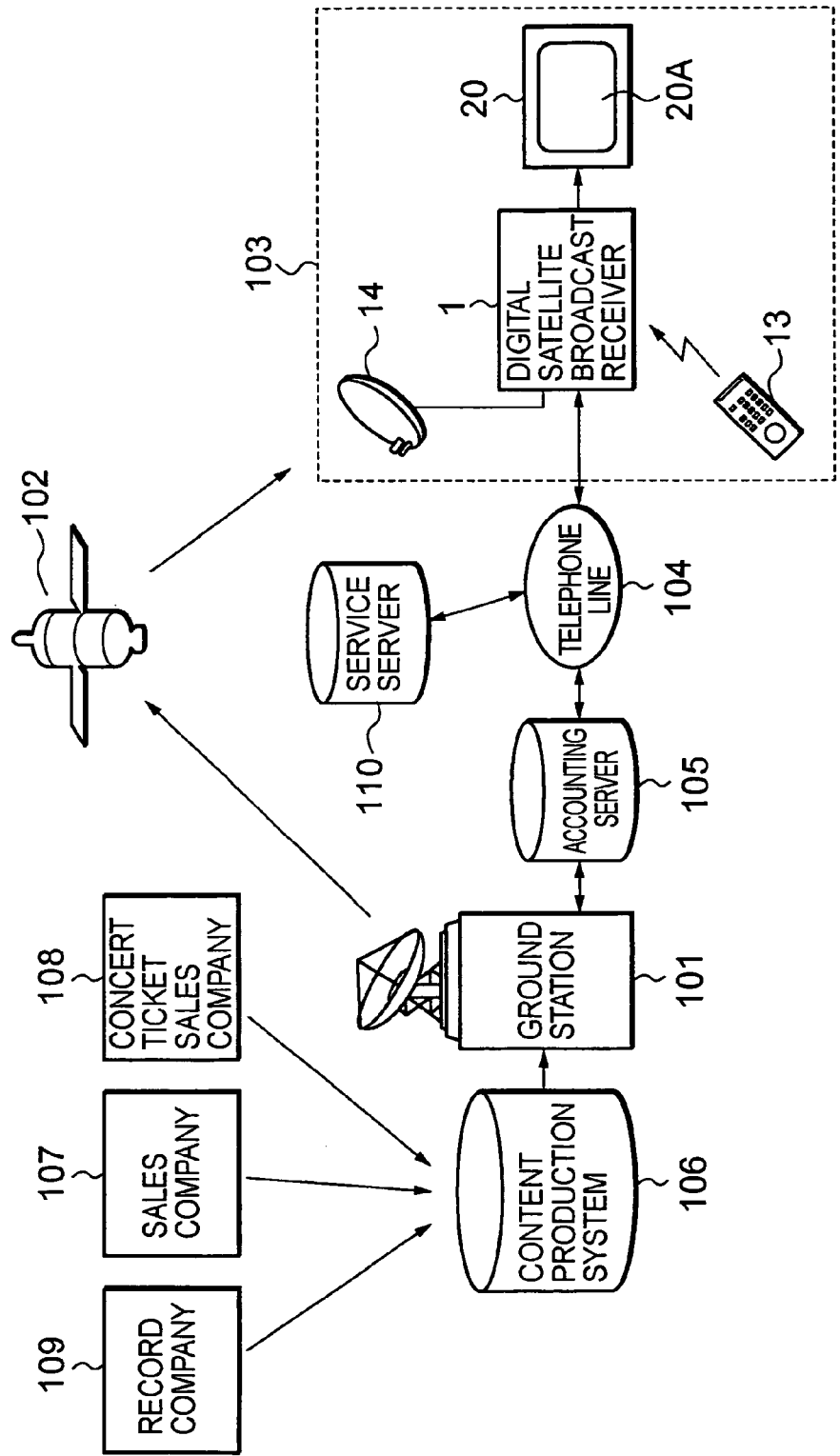
FIG. 1 is a block diagram illustrating a structure of the entire part of a digital satellite broadcast system according to an embodiment of the present invention.

Below, an embodiment of the present invention will be described. The description is carried out in the following order:
1. System Structure.
2. Digital Satellite Broadcast Receiver.
3. Example of Display and Operation of Content Screen Image
4. Structure of Broadcast Content
5. Structure of User-related Information
6. Processing Operation 1. System Structure FIG. 1 shows a structure of a digital satellite broadcast system corresponding to an embodiment of the present application.

The content production system 106 corresponds to an apparatus or system for producing content that can be employed in the present embodiment. The content production system 106 produces a program (content) broadcast at a specific channel.

In one embodiment, the content produced by the content production system 106 is defined such that a promotion video of music is broadcast as main content. Further, in broadcasting promotion videos, the promotion videos having hit chart rankings, such as from first to hundredth places, are successively broadcast, wherein the rankings are renewed every week.

In one embodiment, the screen picture displayed on the reception side, which is displaying this content, is such that the moving picture as part of a promotion video is built in the GUI screen picture. More specifically, combining the promotion video with the GUI provides the content of the program in one embodiment of the present application.

Further, to produce such content, for example, it may be assumed that contracts are established with a specific record company 109, a merchandise sales company 107, and a concert ticket sales company 108. In addition, the contracting companies such as the record company 109, the merchandise sales company 107, and the concert ticket sales company 108 are shown as single companies but each company may exist as a plurality of companies.

Figure 2:
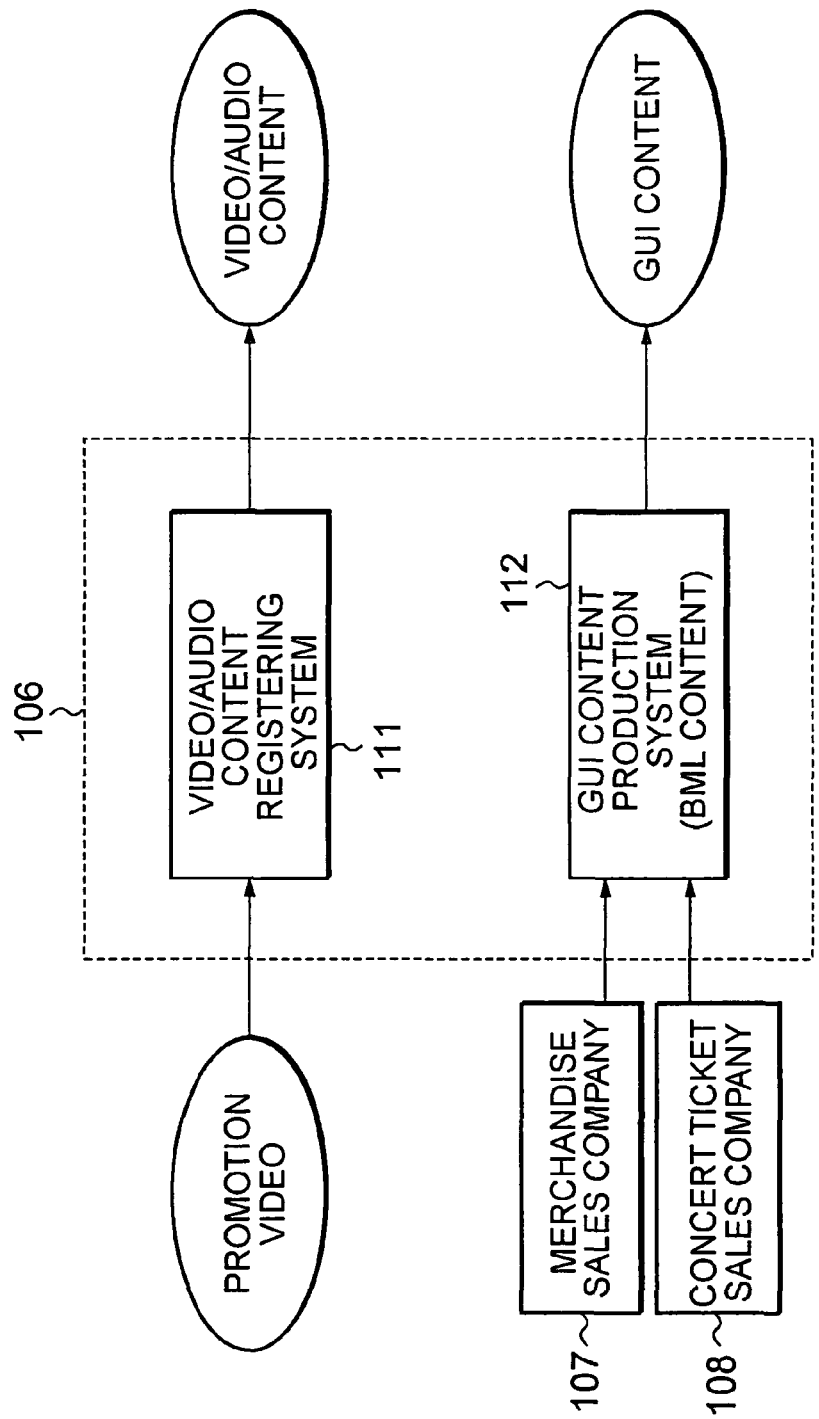
FIG. 2 is a block diagram illustrating a structural example of a content production system.

An embodiment of the content production system 106 is illustrated in FIG. 2.

As shown in FIG. 2, the content production system 106 comprises, for example, a video/audio content registering system 111 and a GUI content production system 112.

The video/audio content registering system 111 registers video/audio data as promotion videos which are collected as materials from record companies 109 shown in FIG. 1. The registered video/audio data of the promotion videos edited to be sequentially broadcast in accordance with the order of the hit chart rankings of from, for example, first to hundredth places, and is transmitted to the ground station as video/audio content of the promotion videos.

The GUI content production system 112 produces GUI content. The GUI content is content data for displaying on the reception side the GUI screen picture in which a moving picture, as the above-described promotion video, is set.

For example, there are various languages for describing such GUI content (application). In one embodiment, BML (Broadcast Markup Language) format derived from XML (Extensible Markup Language) format can be employed. The XML format is for describing script using tags as known and thus, the BML format also is based on the XML format.

The GUI content production system 112 produces GUI content using BML to correspond to the above-described video/audio content. The production of such GUI content is provided by application software such as a script production tool or authoring tool, for example, on a personal computer. The GUI content produced, as described above, by the GUI content production system 112 is also transmitted to the ground station 101 similarly to the above-described video/audio content.

The description is returned to FIG. 1.

The ground station 101 transmits, as the same channel broadcast, the video/audio content and GUI content transmitted from the content production system 106 as mentioned above.

In the present embodiment, the data that serves as video/audio content and a typical broadcast program, is compressed-and-coded by the MPEG (Moving Picture Experts Group) 2 system and then transmitted.

Accordingly, in the ground station 101, the video/audio content transmitted from the content production system 106 is encoded by the MPEG-2 system and then, compression coded. This provides compressed-and-coded video data and audio data from the video/audio content transmitted from the content production system 106. The compressed-and-coded video data and audio data and the GUI data transmitted from the content production system 106, similarly to the video data and audio data, are synthesized by multiplexing, for example, to be included in one transport stream. Thus, the GUI data is handled as data broadcasting in the digital satellite broadcast system.

The transponder obtained by synthesizing as mentioned above may be processed further including the addition error correction codes, modulation, and frequency conversion and then transmitted to the satellite 102.

As described above, the signal transmitted from the ground station 101 is received by reception facilities 103 of respective homes through the satellite 102.

In one embodiment, the reception facility 103 of each home may include a parabolic antenna 14, a digital satellite broadcast receiver 1, and a monitor apparatus 20.

In one embodiment, a remote control 13 for operating the digital satellite broadcast receiver 1 may be provided.

The signal broadcast through the satellite 102 is received by the parabolic antenna 14. The received signal is converted to a predetermined frequency by an LNB (Low Noise Block Down Converter) mounted on the parabolic antenna 14.

In one embodiment, the operation of the digital satellite broadcast receiver 1 includes selecting a predetermined channel of a signal (carrier) from the received signal, demodulating the selected signal to obtain the video data and audio data as a program (video/audio content) to output the video signal and the audio signal. Further, the digital satellite broadcast receiver 1 also performs reproduction display outputting for data broadcasting based on the data (GUI content) as data broadcasting service multiplexed with the data of the program and transmitted. The output of such a digital satellite broadcast receiver 1 is supplied to, for example, a monitor apparatus 20. This provides picture display (including the picture of the data broadcasting) of the program of the channel selected by the digital satellite broadcast receiver 1 on the display screen picture 20A of the monitor apparatus 20. Further, audio is output by a speaker or the like which may be part of the monitor apparatus 20.

The digital satellite broadcast receiver 1 can be connected to an accounting server 105 through, for example, a telephone line 104. At the digital satellite broadcast receiver 1, if downloading of, for example, audio data of music is carried out, corresponding history data is stored on the side of the digital satellite broadcast receiver 1. The stored history information is transmitted to the accounting server 105 through the telephone line 104 at a predetermined time period. The accounting server 105 sets an amount of money in accordance with the transmitted history information which can be used when the accounting server executes an accounting process to charge the user.

Further, the accounting server 105 may be connected to a predetermined service server 110 through the telephone line 104. This provides a connection with the service server 110 in response to the operation or the like when the GUI screen picture is displayed, for example, on the side of the digital satellite broadcast receiver 1 for reception of a service provided by the service server 110. The service server 110 may also be connected to plurality of devices as required.

2. Digital Satellite Broadcast Receiver

An embodiment of the internal structure of the digital satellite broadcast receiver 1 equipped in the reception facility 103 in the above-mentioned digital satellite broadcast system will now be described with reference to FIG. 3.

Figure 3:
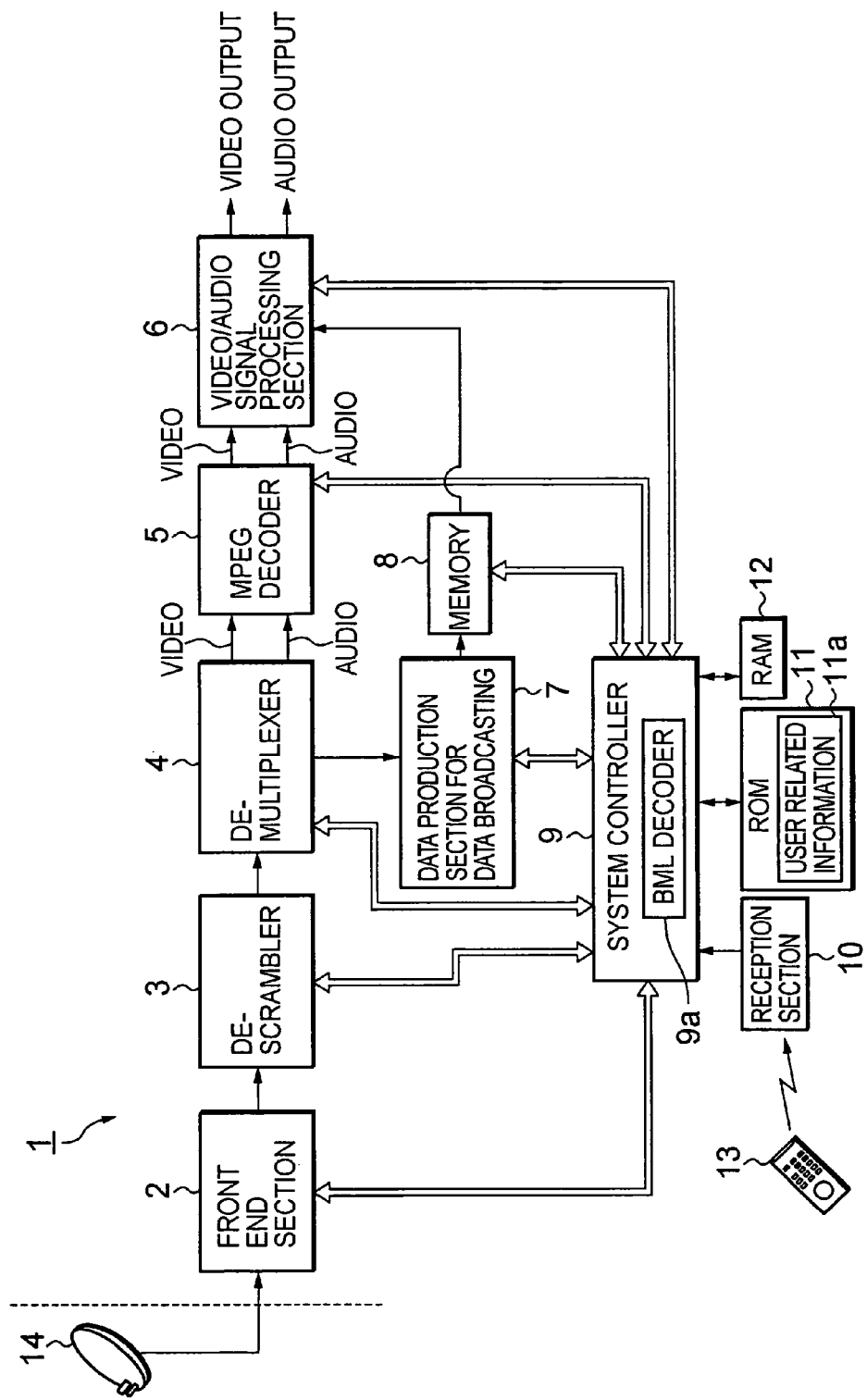
FIG. 3 is a block diagram illustrating a structural example of a digital satellite broadcast reception apparatus.

In FIG. 3, the parabolic antenna 14 shown in FIG. 1 is also shown. The parabolic antenna 14 receives the broadcast signal from the satellite 102 and converts it into a predetermined radio frequency signal with the built-in LNB (Low Noise Block Down Converter) to supply it to the digital satellite broadcast receiver 1.

The digital satellite broadcast receiver 1 is supplied with the received signal and converted to have the predetermined frequency by a front end section 2.

The front end section 2 receives the carrier (reception frequency) based on a setting signal, in which transmission specifications or the like from the system controller 9 is used to obtain a TS (Transport Stream) by applying, for example, a Viterbi demodulation process, or an error correction process or the like thereto.

The TS according to the standard of the digital satellite broadcast is, as known, obtained by multiplexing compression data, which is derived by compressing the video signal with additional information, for example, using the MPEG-2 (Moving Picture Experts Group Layer 2) system. Further, as described above, the data used for data broadcasting for a data broadcasting service is multiplexed, as required.

Further, the compression data derived by compressing the video signal and the audio signal, mentioned above, may be multiplexed as an ES (Elementary Stream). Further, as the additional information inserted by the broadcast side, PSI (Program Specific Information: program specifying information) for storing tables such as the PAT (Program Association Table) and the PMT (Program Map Table), and the SI (Service Information: program arrangement information) are provided.

The multiplexing of the above-mentioned information may be carried out by storing the above-described ES and additional information such that the TS forms a transport stream packet (TS packet) of 188 bytes.

The TS obtained at the front end section 2 is supplied to a de-scrambler 3.

Further, the front end section 2 obtains a packet of PSI (Program Specific Information) from the TS to renew the selection station information and obtains a component PID (Program ID) of each channel in the TS to transmit it, for example, to the system controller 9. The system controller 9 utilizes the obtained PID in reception signal processing.

The de-scrambler 3 receives a previously prepared de-scramble key data from the system controller 9 and the system controller 9 sets the PID there. Then, a de-scramble process is executed based on the de-scramble key data and the PID.

Further, in describing confirmation, the TS output from the de-scrambler 3 may indicate that the ES of a plurality of programs are multiplexed. Further, the additional information including the data broadcasting data, and the PSI is multiplexed without being removed.

The de-multiplexer 4 separates the necessary TS packet from the TS supplied from the de-scrambler 3 in accordance with a filter condition set by the system controller 9. Thus, for example, at the de-multiplexer 4, as the TS packets for one target program, for example, the TS packet of the video data compressed by the MPEG-2 system as a video program and the TS packet of the audio data compressed by the MPEG-2 system, are obtained. Next, the compression video data and the compression audio data obtained, as mentioned above, are supplied to the MPEG decoder 5.

The de-multiplexer 4 separates the data broadcasting data of desired data broadcasting as a target and supplies it to the data production section 7 for data broadcasting.

Further, the individual packets of the compression video/audio data separated by the de-multiplexer 4 and input into the MPEG decoder 5 are supplied to the MPEG decoder 5 in a PES (Packetized Elementary Stream) format.

Further, the setting of the above-described filter condition may be carried out by extracting the PAT, PMT, or the like included in the TS, for example, in the de-multiplexer 4, and transmitting them to the system controller 9. Next, the system controller 9 sets the filter condition for the de-multiplexer 4 based on the details in the information described in the transmitted PAT, PMT and the like.

The MPEG decoder 5 comprises a video decoder for executing a decoding (expansion) process for the compression video data in accordance with the MPEG-2 format and an audio decoder for executing a decoding process for compression audio data in synchronization with the above-mentioned video data output in accordance with the MPEG-2 format. The input compression video data is decoded by the video decoder and the input compression audio data decoded by the audio decoder.

In this case, for example, the decoded video data is subjected to the predetermined signal process to be properly displayed in accordance with a predetermined television system, such as an NTSC system, to provide an output as a digital video signal.

Further, the decoded audio data is output, for example, as a digital audio signal.

In the present embodiment, the digital video signal and the digital audio signal output by the MPEG decoder 5, as mentioned above, are input to the video/audio signal processing section 6.

The data production section 7 for data broadcasting is supplied with the packetized data broadcasting data, for example, in the TS packet format from the de-multiplexer 4. Then, the data production section 7 executes a process for releasing the packetization of the input TS packet, or the like, to generate the data broadcasting data. The data broadcasting data generated, as mentioned above, is written from the data production section 7 and onto the memory 8 to be held there, for example, under the control of the system controller 9.

The memory 8 may include a separate memory for holding the data broadcasting data or with a RAM or the like used by the system controller 9 as its work area.

The system controller 9 reads out the required data broadcasting data from the memory 8 to transmit it the video/audio signal processing section 6 in accordance with the timing indicating when the data broadcasting data is to be displayed.

In one embodiment, in operation, the video/audio signal processing section 6 executes a predetermined signal process to the digital video signal and the digital audio signal of a video program input for the MPEG decoder 5 to output a video signal and an audio signal for display output.

If it is necessary to provide an output display of the data broadcasting, the video/audio signal processing section 6 converts the data broadcasting data input under control of the system controller 9, as mentioned above, into screen picture data. After this, the data broadcasting screen picture data is superimposed on the picture of the digital video signal of the video program input from the side of the MPEG decoder 5. Then, the video signal on which the data broadcasting pictures is superimposed, as mentioned above, is subjected to predetermined signal processing operation for a display output similar to the case mentioned above to output a video signal.

Further, if the data broadcasting is BML content like the GUI content in the present embodiment, the BML content is reproduced to provide an output as follows:

The system controller 9, according to an embodiment, has a function for a BML decoder 9a in accordance with a program stored in the ROM 11. If the data for data broadcasting generated at the data production section 7 is BML content, the system controller 9 reads out the script described as the BML content, and the BML decoder 9a interprets the description details of the script. Then, according to the description in the script, for example, the video/audio signal processing section 6 can be controlled.

At the video/audio signal processing section 6, a GUI screen picture is produced using, for example, entities (objects) such as text (document) or a button stored in the memory 8 as the BML content under the control of the system controller 9. The GUI screen picture is output as a video signal.

The system controller 9 executes control processes to obtain predetermined operations in the digital satellite broadcast receiver 1 as mentioned above. The system controller 9 comprises, for example, a CPU (Central Processing Unit) or the like and a ROM 11 and a RAM 12. The ROM 11 stores programs to be executed by the system controller 9 including the BML decoder 9a and initial setting information. Further, the ROM 11, according to the present embodiment, comprises a non-volatile memory element writable to store the data memory, for example a flash memory or the like which may be useful during a power supply interruption. Then, upon power up of the non-volatile memory, for example, user related information, which will be mentioned below, is stored.

Further, at the digital satellite broadcast receiver 1, a remote control device 13 as a separate body is provided. The remote control 13 has various operating elements for operating the digital satellite broadcast receiver 1. Then, the command signals corresponding to the operations can be carried out. Next, a command signal corresponding to the operation assigned to these operating elements is wirelessly transmitted by, for example, infrared or radio wave.

The wirelessly transmitted command signal is received by a reception section 10 and then supplied to the system controller 9 as an operation command. The system controller 9 executes a predetermined control process to perform the operation corresponding to the input operation command.

3. Content Screen Picture Display and an Example of Operation

When the digital satellite broadcast receiver 1, having the structure shown in FIG. 3 mentioned above, receives the program (also referred to as PV (Promotion Video) content) comprising the video/audio contents and GUI content produced by the content production system 106 previously shown in FIG. 1, the picture and audio corresponding to the content is output.

Further, as mentioned earlier, the PV content according to the present embodiment is displayed such that the video/audio content as promotion video is provided in the GUI screen picture. The user can perform operations to the GUI screen picture.

Then, a description will be provided of an example of displaying the GUI screen picture of the PV content and an example of an operation to the GUI screen picture.

Figure 4:
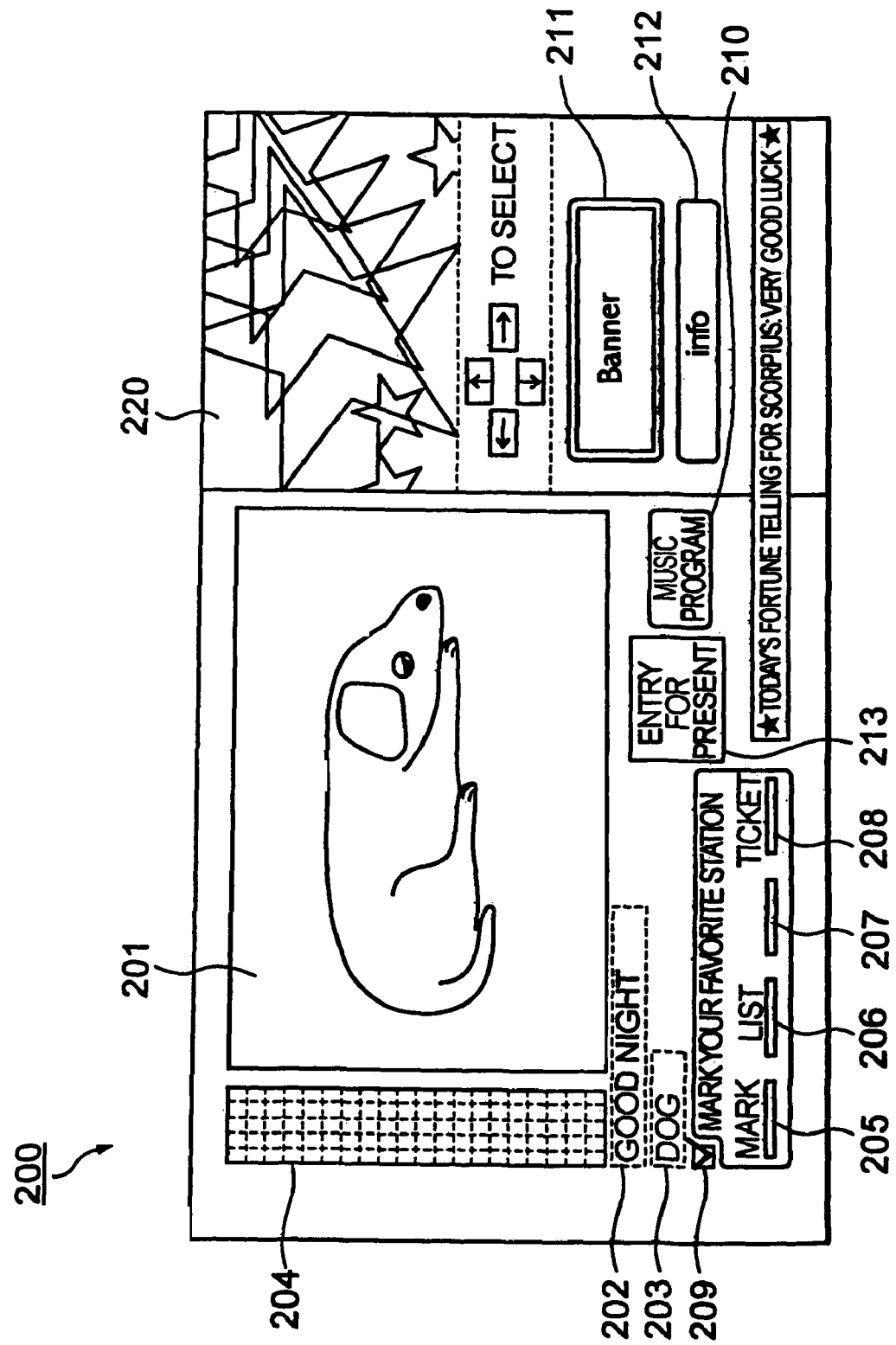
FIG. 4 is an illustration showing an example of a display condition of a top screen.

FIG. 4 illustrates an example of displaying a top screen picture 200 that is initially displayed on the display screen 20A of the monitor apparatus 20, for example, if the channel of the PV content is received.

Further, as described below, the top screen picture includes various buttons. These buttons are first operated by operation of the up, the lower, the left, and the right keys on the remote control 13. Thus, in response to the operation of the up, the lower, the left, and the right keys, the active key shifts upward, downward and left and right, respectively, among these buttons arranged on the screen picture. When the target button e activated, the operation of the decision key corresponds to the operation of the button.

The top screen picture 200, on the main screen picture area 201, a screen picture of the promotion video that is the video/audio content is displayed as a moving picture. Here, as the moving picture is displayed on the main screen picture area 201, the audio of the music or the like is synchronized with the displayed picture and is also output.

Further, at the lower left portion of the main screen picture area 201, a title area 202 and an artist name area 203 are displayed. Conventionally, the title or the artist name in the promotion video was displayed as characters superimposed on the screen picture of the promotion video. Further, the title/artist name, by being superimposed, was frequently displayed only at the start and end parts of the music of the promotion video, and thus, could not be seen during the rest of the music.

In contrast, in the present embodiment, the title area 202 and the artist name area 203 are continuously displayed at different areas than the main screen picture. Thus, if the music is played as the promotion video, the user can know the title and the artist of the music anytime during the playback of the promotion video by viewing the title area 202 and the artist name area 203.

Further, as mentioned above, the PV content, according to the present embodiment, the promotion video of music having hit chart rankings of, for example, first to hundredth, are sequentially broadcast. Thus, the promotion videos change in accordance with the unit of music as passage of time.

In the present embodiment, as the music of the promotion video changes, the titles at the title area 202 and the artist name at the artist name area 203 also automatically change.

The change of the display mentioned above is provided by the execution of a process by the system controller 9 (BML decoder 9a) in accordance with the script as the GUI content.

For example, a script of the GUI content may describe an instruction for, if the promotion video (music) at the main screen picture area 201 changes, displaying the title and artist names at the title area 202 and the artist name area 203 corresponding to the switched promotion video.

In accordance with the description, the BML decoder 9a reads the information of the title and artist names corresponding to the switched promotion video from the titles and artist names held as entities (object, external reference file or the like), for example, in the memory 8. Then, the generation process of the GUI screen picture executed by the video/audio signal processing section 6 displays the retrieved title and artist names at the title area 202 and the artist name area 203, respectively.

Further, at the left side of the main screen picture area 201, a music gauge area 204 is arranged.

The music gauge area 204 provides a graphical display indicating which music's promotion videos have been viewed therethrough, from the promotion videos having rankings of the first to the hundredth places as viewing history of the PV contents by the user. This will be described with reference to FIGS. 5A to 5D.

Here, it is assumed that there is no promotion video in which music is viewed from the start to the end of the music therethrough. In this case, nothing is displayed in the entire part of the music gauge area 204, i.e., the same color as the background is displayed. FIG. 5A schematically shows this condition.

As shown in FIG. 5A, the music gauge area 204 is, in fact, a display region made up of arranged cells 20. There are a hundred of cells 204a comprising a matrix of 5 (horizontal)× 20 (vertical). Each of the cells 204a correspond, for example, to the order of the promotion videos having rankings from the first to hundredth places in accordance with the arrangement order as shown.

Here, in this condition, it is assumed that the user views the promotion video having the third ranking from the start to the end thereof at the first time. Then, in accordance with the viewing history, the cell 204a corresponding to the third ranking, is, as shown in FIG. 5B, displayed, wherein the cell is fully painted with a predetermined color.

Further, after this, if it is assumed that the user views the promotion videos having rankings of the tenth, nineteenth, and twenty-seventh places from the start to the end, accordingly, the cells 204a corresponding to rankings of the tenth, nineteenth, and twenty-seventh places are, as shown in FIG. 5C, displayed with a predetermined color(s).

If, for example, the user further views the promotion videos having other rankings from the start to the ends the corresponding cells 204a are sequentially displayed with a predetermined color corresponding to the rankings of the viewed promotion videos. Finally, if all promotion videos having the rankings of the first to hundredth places are viewed therethrough, as shown in FIG. 5D, all the cells 204a are displayed with predetermined colors, respectively.

Here, the cells 204a may have the same color. However, in the present embodiment, if all the cells 204a are displayed, the entire part of the music gauge area 204 indicates a picture pattern or characters or the like in accordance with a predetermined design.

This provides a more visually interesting experience for the user. Further, some users may desire to complete the picture pattern on the music gauge area 204 by viewing more promotion videos having different rankings therethrough. This may make the user more inclined to view the promotion videos.

Here, the display of the cells 204a at the music gauge area 204 is also provided by the execution of the script in the GUI content by the BML decoder 9a. However, this processing operation will be described later.

Further, in the present embodiment, for example, as described above, the "Entry For Present" button 213 is first displayed if a user has viewed all promotion videos having rankings of the first to hundredth places therethrough, and thereby the picture pattern at the music gauge area 204 is completed. Also this display is, as will be mentioned later, provided by the process of the BML decoder 9a based on the script of the GUI content.

When the "Entry For Present" button 213 is operated, for example, the display is changed to a screen picture for entry to receive a present at the same reception channel by the control according to the script. The user can enter to receive a present by the predetermined operation toward the screen picture of entry for a present. The information of entry to receive a present is, for example, transmitted to the service server 110 (refer to FIG. 1) providing the entry for a present through the telephone line 104.

That is, in this case, if a user views all promotion videos having the rankings of the first to hundredth places therethrough, the user is provided with the opportunity for entry to receive a present as a reward. This increases the entertainment and additional value of the system.

Further, under the title area 202 and the artist name area 203, there are provided areas where color buttons are arranged such as a blue button 205, a red button 206, a green button 207, and a yellow button 208.

The indications of these color buttons correspond, for example, to the color buttons (blue, red, green, yellow) provided on the remote control 13. That is, the operation of the blue button as a color button on the remote control corresponds to the operation of the blue button 205 on the screen. Thus, the operation of these color buttons (the blue button 205, the red button 206, the green button 207, and the yellow button 208) does not require operation of the up, down, left, and right keys, and the decision key unlike other buttons.

In the present embodiment, the color buttons (the blue button 205, the red button 206, the green button 207, and the yellow button 208) are provided with functions as follows:

The blue button 205 functions for a marking operation. For example, it is assumed that the user is viewing a promotion video on the top screen 200 and has a preference for that promotion video. In this case, the user can perform a marking operation by operating the blue button on the remote control 13. According to this, the music of the promotion video displayed on the main screen picture area 201 is registered on the side of the digital satellite broadcast receiver 1 and is marked as a favorite. Here, in accordance with registering as mentioned above, the check box 209 for the blue button 205 is marked with a check mark as shown. For example, after this, if the promotion video of the music is broadcast again, the check mark is automatically displayed.

Further, for example, if the picture displayed at the main screen picture area 201 is for a commercial message or the like, which is other than the promotion video, the "Mark" displayed above the blue button 205 is not displayed, so that the operation of the blue button 205 is disabled.

Further, the red button 206 functions as a button for displaying a list screen picture. When the user operates the red button 206, for example, the list screen picture 250 shown in FIG. 6 is displayed.

The list picture 250 shown in FIG. 6 displays the list of the promotion videos (music) registered up to the point by the marking operations mentioned above by the user, and the list of the music is displayed at the list display area 251. Here, corresponding to the display of the list of the marked music, a tag for the list display area 251 locations at the "Marked Music" button 254 is arranged at the lower right portion of the list display area 251.

At the list display area 251, five areas including music information areas 252-1 to 252-5 are displayed. In the music information areas 252-1 to 252-5, titles and artist names of music are displayed, respectively. Further, the order of hit chart rankings is displayed in alphanumerical order. Furthermore, check boxes 253 are provided on the inside portion of the music information areas 252-1 to 252-5, respectively. The check mark at the check box indicates that the user marked the music.

Here, the user can cancel the check displayed at the check box 253 by operation of the remote control 13. This releases the registration of the music intentionally marked by the user afterward. In addition, an operation for attaching, again, the check released on the screen is also possible.

Further, there are provided a page return button 258, and page advance button 259 at the upper and lower locations within the list display area 251, respectively. The operation of these buttons can change the page of the list of the music displayed within the list display area 251, like pages being turned over.

Furthermore, at the lower left side of the list display area 251, the main picture area 201a is displayed at a small area to show the content of the video/audio content currently broadcast. In addition, in a similar manner as the main screen picture area 201a, the colors buttons (the blue button 205, the read button 206, the green button 207, and the yellow button 208) are displayed above the main screen picture area 201a. In this case, the blue button 205 is effective and thus, provides the marking operation.

Furthermore, the operation of the "To Top Screen" button 257 returns the screen picture back to the top screen picture 200 shown in FIG. 4.

Further, the operation of the "To CD/DVD Shopping" button 256 located to the right of the "To Top screen" button 257 will be described later.

Figure 7:
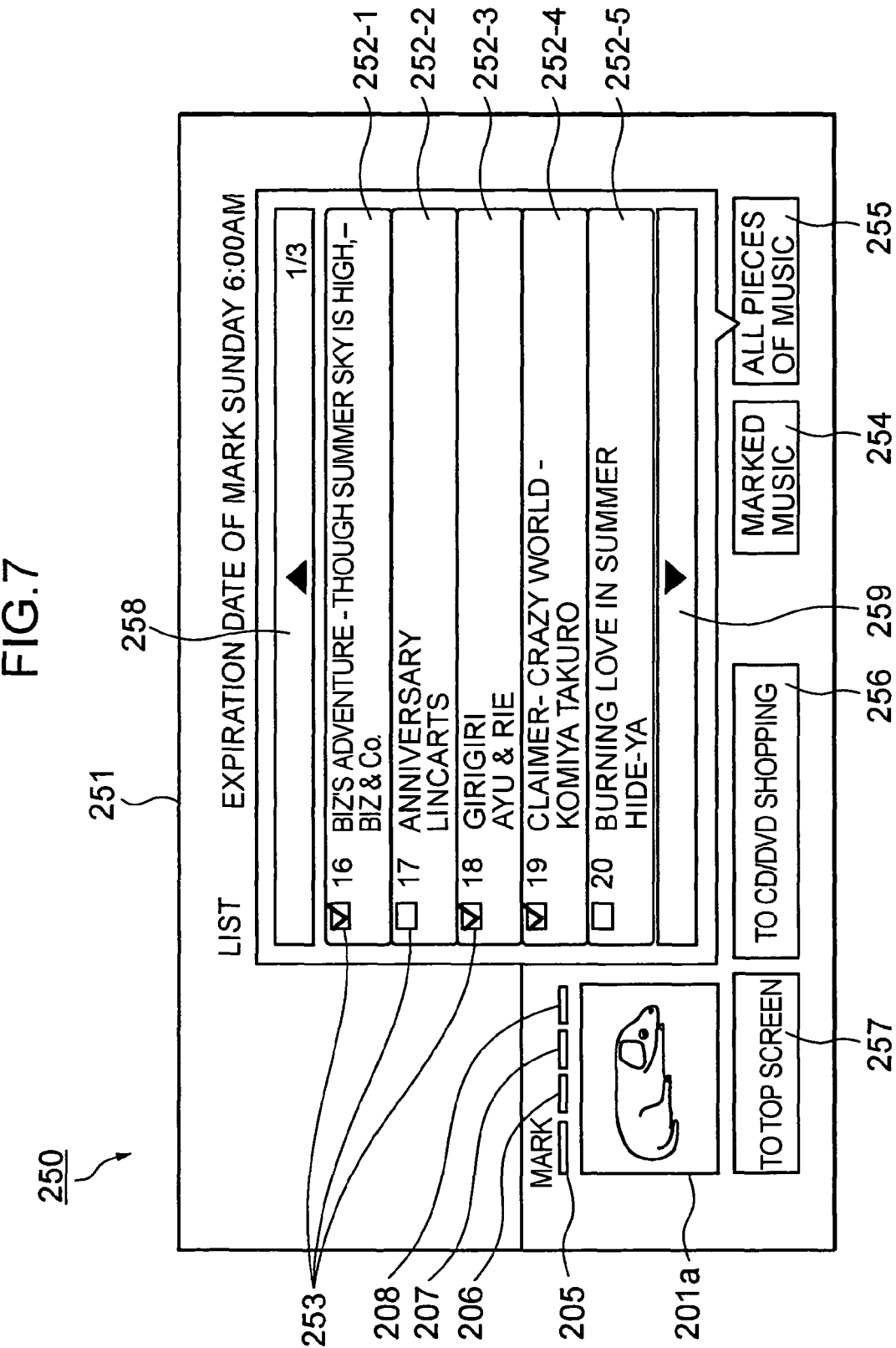
FIG. 7 is an illustration showing an example of the display condition representing the list picture of all pieces of music.

For example, in the condition of the list display of the marked music shown in FIG. 6, it is assumed that the "All Pieces Of Music" button 255 located below the list display area 251 is selected. This results in the list screen picture 250 displaying a list of all of the music having the first to hundredth rankings. FIG. 7 illustrates the list screen picture 250.

The display condition of the entire part of the list screen picture 250 shown in FIG. 7 is the same as the list screen picture 250 previously shown in FIG. 6.

However, in this case, corresponding to list-displaying all music, the tag of the list display area 251 is set to the "All Pieces of Music" button 255.

In addition, within the music information areas 252-1 to 252-5, titles and artist names of music are displayed and arranged in accordance with the order of rankings. Here, also on this screen picture, the registration of music as a newly marked music by attaching a check mark to a check box 253 within the music information areas 252-1 to 252-5 or the release of the registration by removing the check mark can be performed.

In the condition when the list screen picture 250 shown in FIG. 6 or 7 mentioned above is displayed, the operation of the "To CD/DVD Shopping" button 256 displays a guidance screen picture for shopping (not shown). Then, the operation of the button for advancing from the shopping guidance screen picture to the next screen changes the display of the merchandise selection screen picture 300 shown in FIG. 8.

Figure 8:
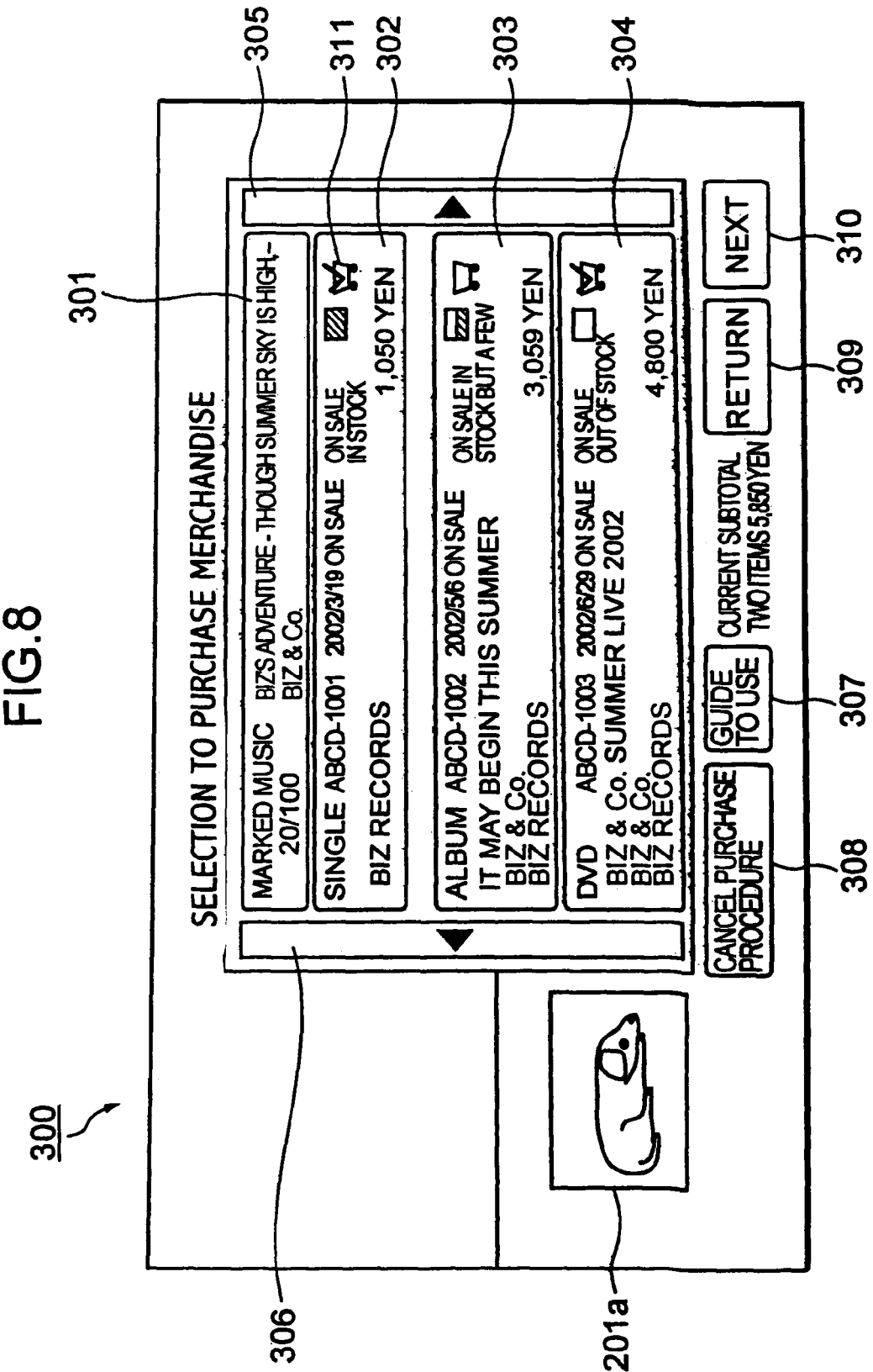
FIG. 8 is an illustration representing an example of the display condition of a merchandise selection screen picture.

The merchandise selection screen picture 300 shown in FIG. 8 provides a user with an opportunity to buy merchandise, as a screen picture for a procedure of buying a CD or DVD as merchandise relating to the music in which marking is registered.

Within the window of the merchandise selection screen picture 300, at the uppermost portion of the screen 300, a marked music display area 301 is arranged where the title, the artist name, and the ranking of one piece of the marked music are displayed.

Under this portion of the screen picture 300, a single CD button 302, an album CD button 303, and a DVD button 304 are arranged. At the single CD button 302, the album CD button 303, and the DVD button 304, contents of the CDs, the album CDs, and the DVDs are identified in accordance with the title of the music displayed at the marked music display area 301 are displayed, respectively. The user operates the button corresponding to a music product that the user desires to buy with reference to the display of these buttons. In response to this operation, a check mark is attached to a check box displayed within a cage type of buttons, respectively, to indicate the music product determined by the user. Further, the operation of the button to which a check mark is attached at the cage type of check box 311 removes the check to cancel a decision to buy selected music product.

Further, if the user desires to view the CD or the DVD of which music has been marked, the user operates the right shift button 305 and a left shift button 306 at the rightmost and the leftmost portion of the window, respectively. This indicates the information of the CD or the DVD including another marked music product as the page changes in the direction corresponding to the operation of the left and the right buttons.

For example, after attaching a check mark for the CD or the DVD which the user desires to buy, the operation of the "To Next" button 310 at the lower right portion of the screen advances the screen picture to the buying procedure screen picture. For example, the displayed picture advances to the user selection screen picture 350 with reference to FIG. 9, as mentioned later. On the other hand, the operation of the adjacent "Return" button 309 returns the screen picture back to the shopping guide.

Furthermore, the operation of the "Cancel Purchase Procedure" button 308 cancels the procedure of buying and returns the screen picture, for example, to the list screen picture 250 shown in FIG. 6 or 7.

Further, the operation of "Guide to Use" button 307 changes the display picture to the screen picture of a guide to use (not shown).

Further, also in this screen picture, the screen picture of the current video/audio content is displayed at the main screen picture area 201a at the small display area.

Figure 9:
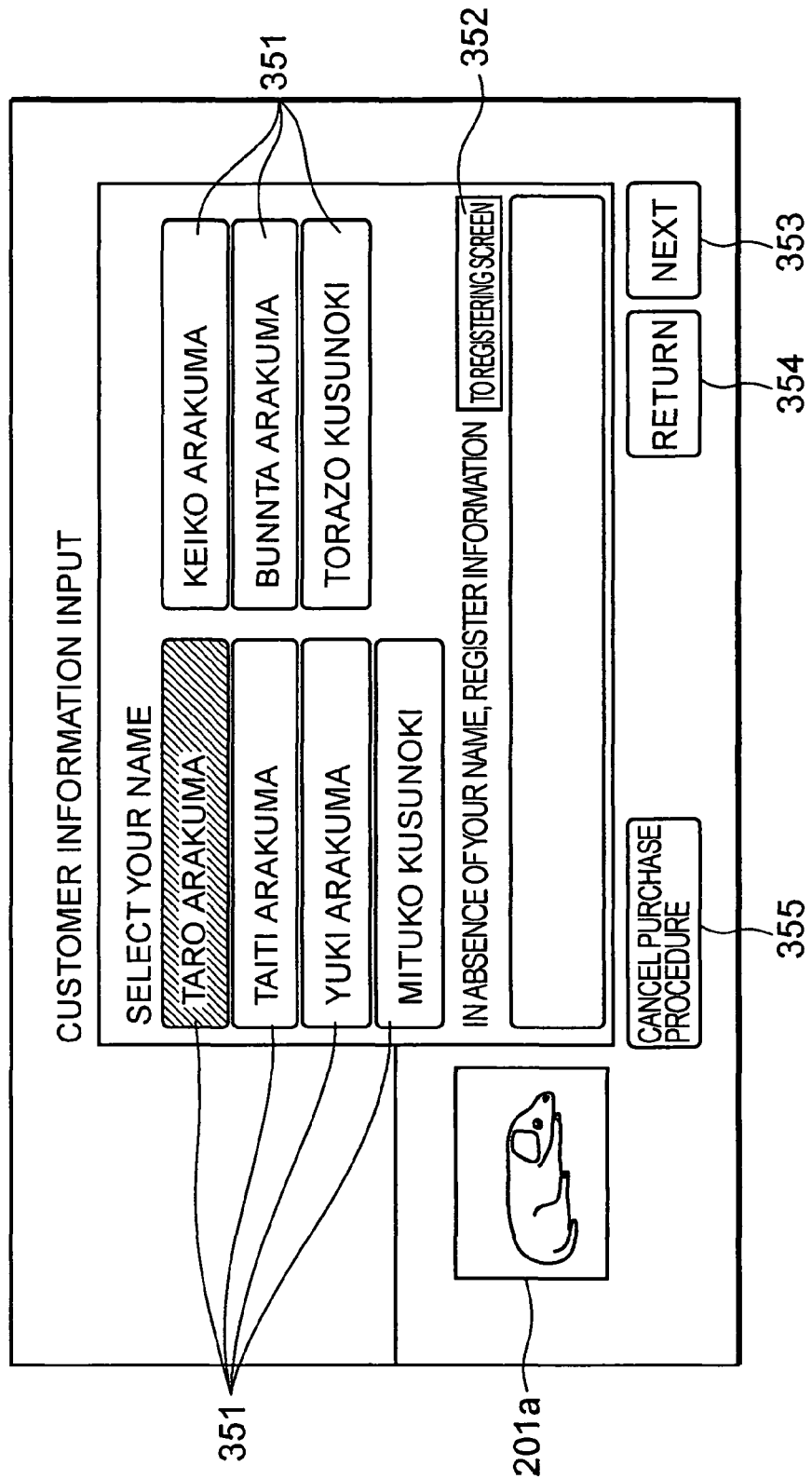
FIG. 9 is an illustration showing an example of the display condition of a user's selection screen picture.

As described above, if the user operates the "Next" button 310 on the merchandise selection screen picture 300 in FIG. 8, the user selection screen picture 350 shown in FIG. 9 is displayed.

In the user selection screen picture 350 shown in FIG. 9, within the window, the user buttons 351 are displayed. On the user buttons 351, there are shown names of the users of whom private information has been registered. The operation of the user button 351 results in a selection by the user to use a service such as shopping.

When the user buys a CD or a DVD, and if the user buys a merchandise using the merchandise buying service via the operation to the digital satellite broadcast receiver 1, it is necessary to first register by storing user's private information (the address, the name, the age, the date of birth, the credit number, or the like) in the digital satellite broadcast receiver 1. Then, a procedure of buying is executed using the registered private information.

In the user selection screen picture 350, the execution of the user selection with the above-mentioned user button 351 indicates that the private information necessary is selected for buying.

When private information is newly registered, the "To registering Screen" button 352 is depressed. Although the detailed description is omitted, this changes the screen picture to that of input screen picture for registering the private information (not shown). The operation of inputting predetermined private information items on the following screen picture registers the private information.

Further, the "Next" button 353 located at the lower portion of the window shifts the screen picture to a screen for the next buying procedure. The operation of the "Return" button 354 shifts the screen picture back to that of the merchandise selection screen 300 as shown in FIG. 8.

In this case, the operation of the "Cancel Purchase Procedure" button 355 cancels the buying procedure up to that point and returns the screen picture, for example, back to the previous list screen picture 250 shown in FIG. 6 or 7. Also in this display screen picture, the picture of the current video/audio content is displayed at the main screen picture area 201a with a small display area.

Further, the change of the screen picture in accordance with the operation as described with the above-mentioned FIG. 4 and FIGS. 6 to 9 is provided by the execution of the process by the system controller 9 (BML decoder 9a) in accordance with the script of the GUI content. That is, in the GUI content, there is provided data and script for entities for displaying the GUI display screen pictures shown in respective drawings as well as in each GUI display picture, there are set links for button operations in accordance with the script. In response to a button operation, processing proceeds to a location to which the link is set, so that a corresponding action occurs to change the display screen picture to the desired display.

Returning to the top display screen picture 200 in FIG. 4, the yellow button 208 as a color button is provided for shifting the display screen picture back to a screen for ticket information providing or ticket buying services. Here, the yellow button 208 is effective only if the artist, of which the promotion video currently displayed on the main display screen picture area 201, provides concert tickets to the ticket sales company 108. If the ticket becomes invalid, for example, the characters "Ticket" above the yellow button 208 is not displayed, and the operation of the yellow button 208 is disabled.

Further, no function is currently assigned to the green button 207.

Further, on the top display screen picture 200, the operation of the "Music Program" button 210 displayed at the lower right of the main display screen picture area 201 changes the station to other music cleared channel contracting with the broadcast of this PV content.

Further, on the top display screen picture 200 shown in FIG. 4, a "Banner" commercial message button 211 and an "Information" button 212 are displayed. At the "Banner" commercial message button 211, a banner commercial message is displayed. The operation of the "Banner" commercial message button 211 changes the GUI display screen picture to a screen picture for providing a service corresponding to the content of the commercial message. The operation of the "Information" button 212 changes the display screen picture to a GUI display screen picture as an information display screen picture illustrating a list of services.

Below, the features of the present embodiment included in the above description will be described in the following order.

[First Feature]

Because the video/audio content according to the present embodiment is the same as a conventional system, promotion videos broadcast by the general broadcast, the content itself (music) changes with the passage of time.

Further, in the present embodiment, the GUI display screen picture relating to the video/audio content automatically changes to be adapted to the content change of such the video/audio content. Thus, the digital satellite broadcast receiver 1 carries out the control base on the script.

This corresponds to a change in the title and artist name displayed at the title area 202 and the artist name area 203 on the top display screen picture 200 in FIG. 4 in accordance with the music of the promotion video.

Further, the check mark of the blue button 205 is invalid if the promotion video is not displayed on the main screen picture display area because a commercial message or the like is being displayed.

Further, in the same top display screen picture 200 shown in FIG. 4, the conditions of the color buttons (the blue button 205, the red button 206, the green button 207, and the yellow button 208) change in enabled/disabled. This corresponds to it. In other words, regarding an artist connected with the promotion video currently reproduced on the main screen picture area 201, the yellow button 208 is effective only if a ticket sales company 108 supplies the concert ticket. This also corresponds to it.

Further, in accordance with a change of the promotion video displayed on the main display area 201, the check condition varies on the check box 209 for marking based on the result of the previous mark operations. This also corresponds to it.

That is, in the first feature, the video/audio content that is a broadcast content of which content itself changes with the passage of time of the broadcast content is defined as a trigger (origin). In addition, the GUI screen picture having a predetermined display content regarding this video/audio content is displayed with the video/audio content, wherein the display content of the GUI screen picture is adaptively varied in accordance with the variation of the content of video/audio content.

For example, conventionally, if additional information corresponding to the main broadcast program is displayed, and the content of the additional information attempts to change with a variation of the content of the main broadcast program, it was set in the video signal of the main broadcast program as superimposing.

On the other hand, according to the present embodiment, on the side of the GUI screen picture independent of the video/audio content corresponding to the main broadcast program, variation of the display content corresponding to the content of the broadcast can be obtained. Further, to obtain such a content variation, for example, it was not executed to sequentially change the content of the data broadcasting in accordance with the variation of the content of the main broadcast content. In other words, it is acquired in accordance with the scripts of the GUI content that has been received as the data broadcasting. This means that it is executed such that the display variation of the GUI screen picture in accordance with the content of the main program is completed at the digital satellite receiver 1 that is on the reception side.

This reduces the necessity of instantaneously changing the content of the data broadcasting in accordance with the variation in the main program, for example, on the broadcast side. Thus, it is sufficient that the broadcast side only prepares one GUI content correspondingly to the successive program content. Specifically, in the present embodiment, the video/audio content, as the main program, is provided by repeatedly broadcasting the promotion videos of music having hit rankings of the first to hundredth places. Thus, there are a hundred patterns in the variation of the content. Therefore, it is very easy to prepare one GUI content in accordance with the content of the broadcast.

From this, the present embodiment can prepare such a program in which a variation in the display content of the GUI screen picture is efficiently provided with a reduction in the amount of work for producing the program. Further, it increases the entertainment characteristic and the convenience for the users.

[Second Feature]

Further, according to the description about the top screen picture 200 shown in FIG. 4, the user can execute the marking operation for the favorite music product with viewing the video/audio content. Then, in accordance with the marking result, the content of the list of the marked music shown in FIG. 6 varies. That is, the display of the GUI screen picture as the list screen picture 250 varies in accordance with the marking operation.

Further, as shown in FIG. 8, in accordance with the result of the marking operation, regarding the target of the CD/DVD shopping, the merchandise selection screen picture 300 is formed only for the marked music and then, output to display it.

The display content variations means that the digital satellite broadcast receiver 1 executes the display control in accordance with the script of the GUI content to change the display of the GUI screen picture in accordance with the behavior that the user operates for the video/audio content as a direct target.

Further, regarding the display variation on the music gauge area 204 on the top screen picture 200 (FIGS. 5A to 5D), the user does not have to carry out special direct operation for the music gauge area 204. However, the display condition of the music gauge area 204 is changed by the user's behavior in which the user responds to the video/audio content as a target, that is, the user views the promotion video.

Also, in this case, the digital satellite broadcast receiver 1 carried out the display control in accordance with the script to change the display of the GUI screen picture in accordance with the user's behavior of "viewing" the target of the video/audio content.

The second feature may be summarized as follows:

The user can perform some behavior directed toward the broadcast content (video/audio content) in which the content itself varies with the passage of time regardless of the operation. In addition, in response to the user's behavior (based on the user's operation or the history of viewing), the digital satellite broadcast receiver according to the present embodiment controls changes to the display content of the GUI screen picture relating to the video/audio content in accordance with the scripts of the GUI content.

For example, the content of video/audio content can be changed in accordance with the user's behavior (actions), for example, in Web pages. However, in this case, for example, the server reads a cookie or the like, or the side of the server acquires the access history in some manner to re-structure the content of the Web page to be transmitted. In other words, there is an external server or an administrator.

On the other hand, in the present embodiment, once the side of the digital satellite broadcast receiver 1 stores history information (which will be described in further detail later), the digital satellite broadcast receiver 1 executes a process to change the display of the GUI screen picture adaptively to the above-mentioned history information in accordance with the script of the GUI content. In other words, in this respect, like the first feature, variation in display of the GUI screen picture in accordance with the content of the main program is executed to conclude at the digital satellite broadcast receiver 1 as the receiving side.

[Third Feature]

Further, at the merchandise selection screen picture 300 described with reference to FIG. 8, the represented merchandise of CDs and DVDs relate to the music to which the user has applied the marking operation.

Furthermore, as described with reference to FIGS. 4 and 5A to 5D, the system provides a user with the right for entry to receive a present by displaying the entry button 213 within the top screen picture 200, if the user viewed all pieces of music having rankings of the first to hundredth places therethrough to display all cells 204*a* at the music gauge area 204.

For example, as described above, displaying the GUI screen picture to purchase CDs and DVDs and providing the right for entry to receive a present by displaying the entry button 213 means providing the user with some service using the GUI screen picture. Further, any of the above-described service providing techniques is made based on the history of the previous use of the digital satellite broadcast receiver 1.

In other words, in the third feature, the service content to be served is changed based on the history of the use of the digital satellite broadcast receiver 1 regarding the user.

Also in this case, such a change in the service is provided by storing the history on the side of the digital satellite broadcast receiver 1 and then, executing the process for changing the GUI screen picture display adaptively to the above-described history information in accordance with the script of the GUI content.

In other words, the change of the provided service is also carried out without intervention of a server, but with completion on the side of the digital satellite broadcast receiver 1.

4. Structure of Broadcast Content

Hereinbelow will be described the structure for providing the first to third features mentioned above. The operation as described above is provided with a script of the GUI content transmitted together with the video/audio content as data broadcasting. The broadcast content according to the present embodiment can be shown by the structure indicated in FIG. 10.

Figure 10:
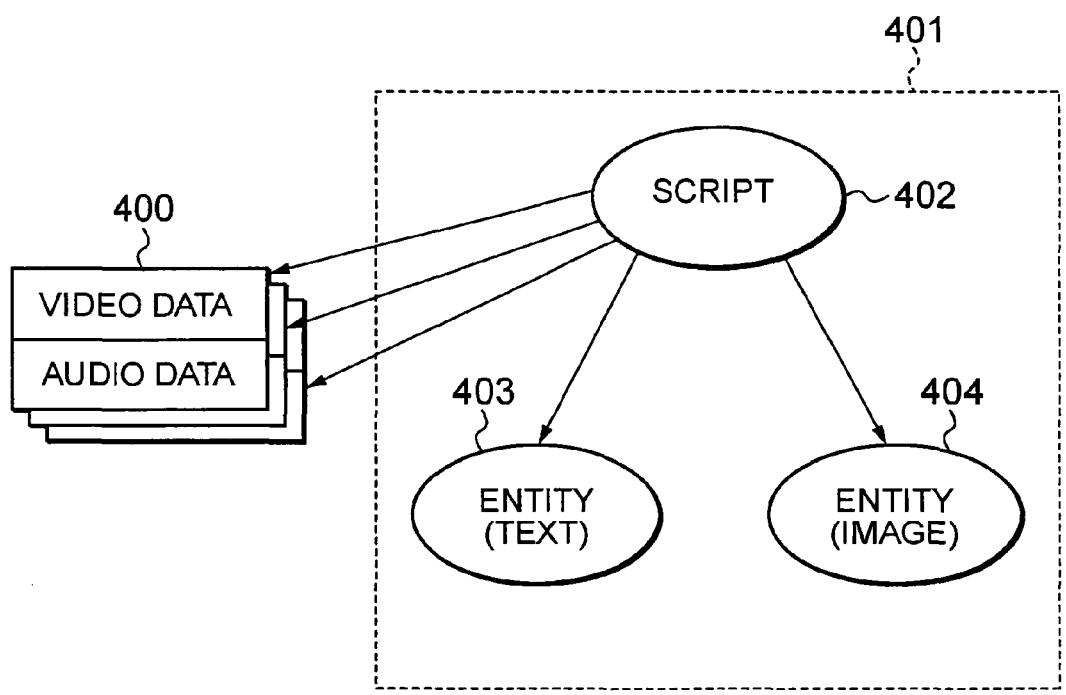
FIG. 10 is an illustration of a structural example of the broadcast content according to the present embodiment.

More specifically, as shown in FIG. 10, broadcast content includes video/audio content 400 as promotion videos at a unit of a piece of music. In this case, the video/audio content 400 includes video data and audio data as a unit of one piece of music. Further, in the case of the present embodiment, a hundred video/audio content 400 corresponding to the list chart ranking of the first to hundredth places are prepared and edited to be sequentially, repeatedly transmitted.

To the digital satellite broadcast receiver 1, as described earlier, the video data and the audio data corresponding to the video/audio content 400 is compressed-and-coded by the MPEG-2 system and then transmitted.

Further, the video/audio content 400 is made to have a corresponding relation, for example, with at least one GUI content 401. Further, the GUI content 401 is transmitted as the above-mentioned video/audio content together with the general broadcast as data broadcasting at the same channel.

Furthermore, the GUI content 401 comprises, for example, as shown in the drawing, script 402 and, for example, an entity 403 for a document, and an entity 404 of a screen picture.

The script 402 is described with tags in the known manner, wherein the execution of the process according to the script provides displaying operations described with reference, for example, to FIGS. 4 to 9 and providing services.

In addition, the entities 403 and 404 include, for example, files as a part of data with a tag in the script. Further, it includes text to which an XML document refers and a picture or the like that is not a file in the XML format. For example, in the case of the present embodiment, there exists, as entities, character stream information and picture files such as buttons and background forming GUI screen pictures as shown in FIGS. 4 to 9.

Further, the execution of a drawing process using these entities in accordance with the description of the script 402 forms the GUI screen pictures shown in FIGS. 4 to 9 and provides a display output. In addition, this provides a change in the display content on the GUI screen picture and a switch in the GUI screen picture.

5. Structure of User related Information

As earlier described as the second and third features, in order to carry out the change or the like of the display content or the provided service in accordance with the history of the user's use, in the digital satellite broadcast receiver 1, such information about the history of the user's use should be stored. This information is included in the user related information 11a stored in the ROM 11 as shown in FIG. 3.

Figure 11:
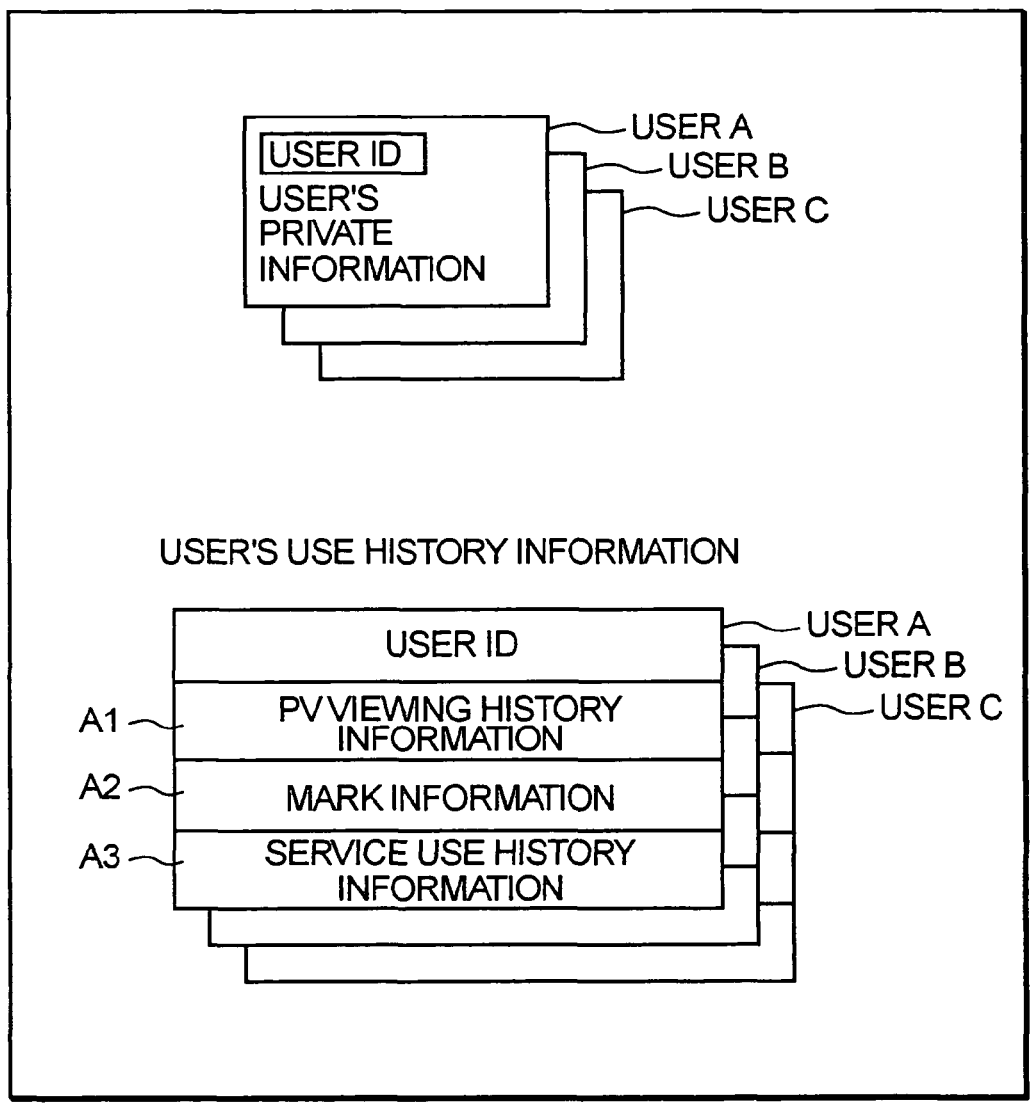
FIG. 11 is an illustration showing a structural example of user-related information.

The structure of the user related information 11a is shown, for example, in FIG. 11.

As shown in FIG. 11, the user related information 11a comprises user's private information of each user and user's use history information of each user.

In a portion of user's private information, as described with reference to FIG. 9, the information includes information about a user who has been registered as a user (address, name, age, credit number, and personal identification number or the like). Then, in the user's private information, a number corresponding to the number of the registered users is stored.

Because a user who has performed a registration process should be provided with a user ID, the user ID is also stored to identify which user corresponds to the user's private information.

The user's use history information is provided for each user who has executed the registration process, and predetermined history information obtained by the user's use of the digital satellite broadcast receiver 1 is stored therein.

In one portion of the user's history information, a user ID is stored to identify which user corresponds to the user's history information. In this case, PV viewing history information A1, marking information A2, and the service use history information A3 is stored.

The structure of the PV viewing history information A1 is shown, for example, in FIG. 12.

As shown in FIG. 12, the PV viewing history information A1 has a structure that includes information pairs of content ID and a number of times of viewing corresponding to the ranking order. In this case, the content ID is one for the video/audio content. That is, a content ID is added to each unit of music broadcast as a promotion video. Here, as an example, it is represented in a hexadecimal notation by xxxxh, as shown in the drawing.

As the PV viewing history information A1 having such a structure, content IDs attached, for example, to a hundred promotion videos currently broadcast are stored corresponding to current rankings from the first to the hundreds, respectively.

The number of times of viewing in this case represents the number of times of viewing and listening to music through promotion videos.

Thus, the reference to the content of the PV viewing history information A1 provides identification as to which promotion videos (music) have been viewed therethrough and the number of times of viewing, out of the hundred promotion videos currently broadcast.

FIG. 13 illustrates a structure of the marking information A2.

The marking information, like the case of FIG. 12, has a structure that includes a relationship between the ranking order and the content IDs that correspond to mark bits, respectively.

For example, the mark bit is set "1" if the marking operation is performed on the promotion video (music) having the corresponding content ID. In the case that no mark is set or the mark is released, the mark bit is set "0".

The reference to the marking information A2 indicates which promotion videos (music) are currently marked as the result of the marking operation described with reference to FIG. 4 or the like.

Figures 14, 15:
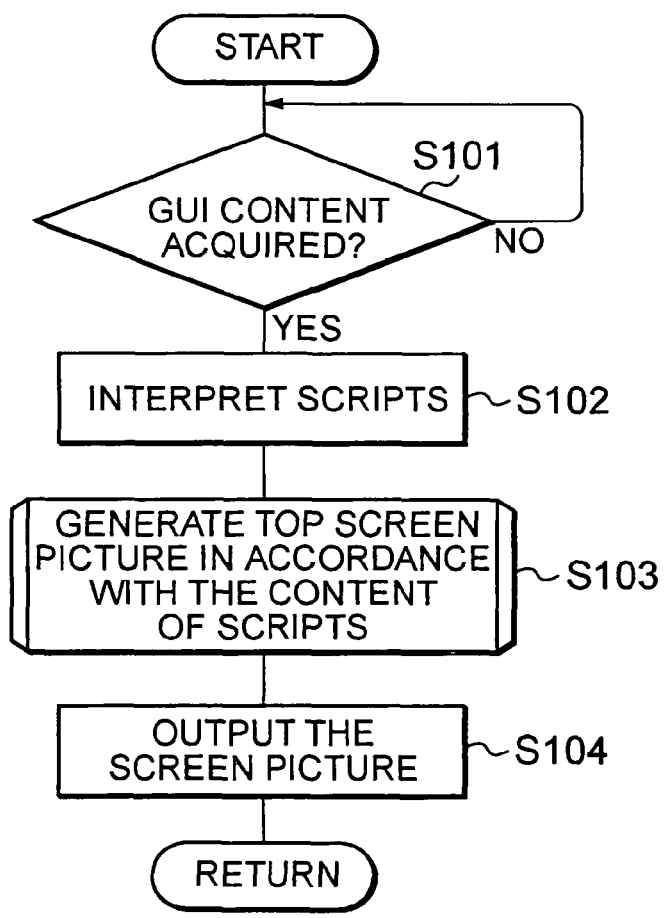
FIG. 14 is an illustration showing a structural example of service use history information.
FIG. 15 depicts a flow chart describing a processing operation for displaying the top screen picture.

FIG. 14 illustrates a structure of the service use history information A3.

The service use history information A3 indicates a relationship between the service IDs and the use dates.

The service ID is an ID for each service that can be provided with GUI screen pictures displayed by the GUI content according to the present embodiment and is included in the structure of the GUI content.

When a user uses some service, for example, by an operation directed to the GUI screen picture, a relationship is established between the service ID indicative of the used service and the information of the use date, and then, the service ID and the information of the use date is stored.

The reference to the service use history information A3 indicates when and what service was used. In this structure, there may be a case in which the same service ID is stored at different use dates. Thus, the number of the same service IDs indicates the number of times of use of each service.

6. Processing Operation

Next, processing operations executed by the system controller 9 as the BML decoder 9a in accordance with the script 401 of GUI content will be described with reference to flow charts in FIGS. 15 to 20.

First, FIG. 15 describes a processing operation to display the top screen picture 200. The system controller 9 waits for a newly acquired GUI content in step S101. For example, if regarding a reception channel, switching is performed the channel of the PV content according to the present embodiment, and if the rankings are changed, a new GUI content is received and achieved. Further, if it is determined that a new GUI content is received and acquired due to the start of broadcast of the new GUI content as mentioned above, processing proceeds to the process in step S102.

In step S102, the script 402, included in the received and acquired GUI content, is read, and the script is interpreted. In the next step S103, the video/audio signal processing section generates the top screen picture 200 in accordance with the description of the script recognized by the above-mentioned analysis.

In the top screen picture 200 generated as mentioned above, though a detailed description about the process is omitted, for example, as described with reference to FIG. 4, the cells 204a are displayed in the music gauge area 204 reflecting the promotion videos that have been viewed therethrough by the user. Further, in accordance with the content displayed within the current main screen picture area 201, the GUI screen picture in which the validation/invalidation is set regarding the color buttons such as the blue button 205 and the yellow button 8 are formed.

Next, the picture of top screen picture 200 generated as mentioned above is output as a video output by the process in step S104. This provides the display output by means of the picture, for example, using the monitor apparatus 20.

Specifically, the display control of the cells 204a on the music gauge area 204 executed in the generation process of the top screen picture 200 in step S103 will be described later with reference to FIG. 19.

Figure 16:
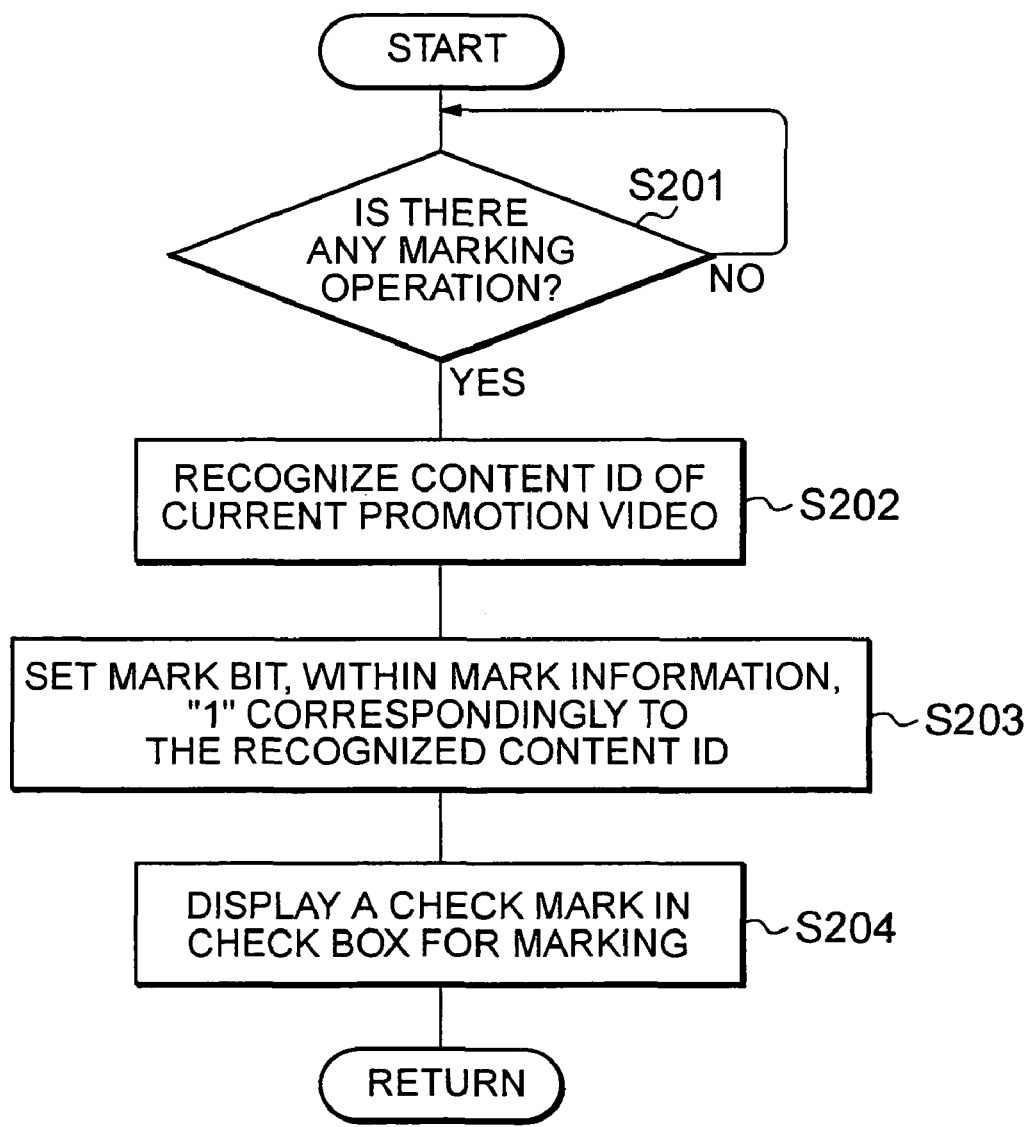
FIG. 16 depicts a flow chart describing the processing operation corresponding to a marking operation.

Next, with reference to FIG. 16, a description will be provided of a process corresponding to the marking operation by the user.

The system controller 9 waits for the marking operation in step S201, and proceeds to step S202 if it is determined that the marking operation has been performed.

In step S202, the content ID corresponding to the promotion video (music) currently displayed (currently received) on the main screen picture area 201 is recognized.

There are devices for acquiring the content ID, for example, it can be performed in the following ways:

For example, the content ID is superimposed on the broadcast data and then transmitted from the broadcast side as one piece of additional information for each video/audio content as a promotion video (music). In the digital satellite broadcast receiver 1, it is sufficient to hold the received and acquired content ID, which was extracted from the broadcast signal, in the RAM 12 together, for example, with other additional information. Then, the content ID held in the RAM 12 is read if the process in step S202 is to be executed. This provides recognition.

The ROM 11 memory holds the user related information 11a, and at the user's use history information in the user related information 11a, the marking information A2 is stored. In the next step S203, in the marking information, the mark bit corresponding to the content ID recognized in step S202 mentioned above is set to "1".

In the present embodiment, the user's use history information, which is storing the marking information A2, is prepared for each registered user. Then, in the present embodiment, first, the user ID of the user who is currently set as the user of the digital satellite broadcast receiver 1 is recognized and then, the mark bit is rewritten in the marking information within the user's use information in which the recognized user ID is recorded.

Further, it may be considered that the marking information is common to users. However, in this case, the recognition of the user of the user as mentioned above is unnecessary.

Here, to display the top screen picture 200, the process in the following step S204 executes the display control for displaying the check mark in the check box 209 for marking on the top screen picture 200.

Next, with reference to FIG. 17, will be described the processing operation to start the display of the list screen picture 250 shown in FIGS. 6 and 7.

Figure 17:
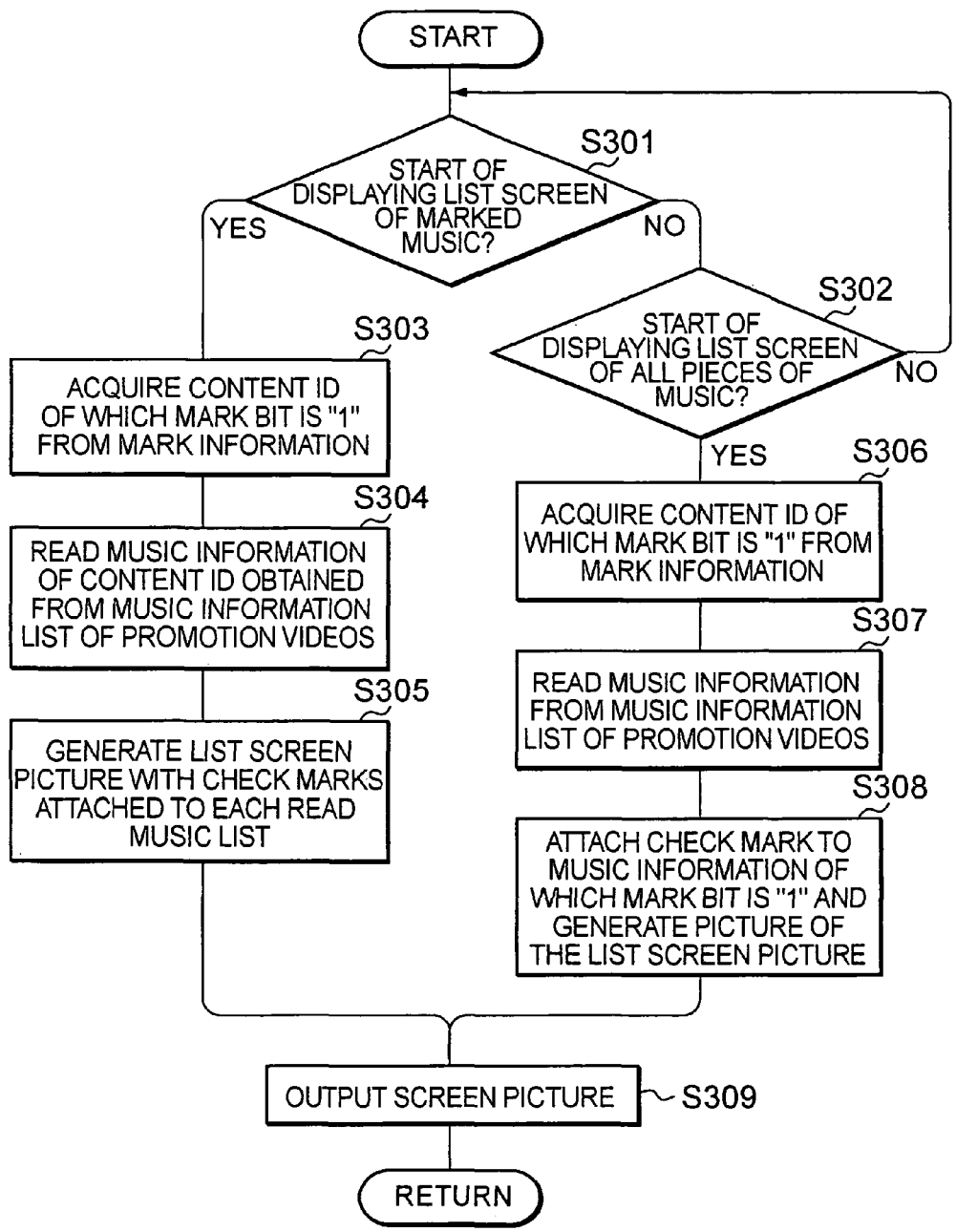
FIG. 17 depicts a flow chart describing a processing operation for displaying a list screen picture.

In the process shown in FIG. 17, first, in step S301, it is determined whether to start the display of the list screen picture 250 of the marked music. The processing proceeds to the process after step S303 inclusive, if an affirmative result is obtained due to a jump to a location where a link is set, for example, if the read button for displaying the list screen picture on the top screen picture 200 on FIG. 4 is operated, if the "Marked Music" button 254 on the list screen picture 250 shown in FIGS. 6 and 7 is operated, or if an operation for a return from another GUI screen picture to the list screen picture 250 of the marked list screen picture 250.

On the other hand, if the above-mentioned operation is not executed, a denial result is provided, and the processing proceeds to step S302.

In step S302, it is determined whether the list screen picture display for all music is to be started. The processing proceeds to the process after step S306 inclusively if an affirmative result is obtained due to the jumps to the set link in response, for example, to the operation of "All Music" button 254, the operation causing return to the list screen picture 250 of all music from other GUI screen pictures, or the like.

In step S303, the marking information within the user's use history information indicated by the user ID of the user set as the current user, is read out from the user's use history information 11a in the ROM 11. Next, the content ID having a mark bit of "1" is obtained from the marking information which has been read, and then, held in the RAM 12.

Here, the GUI content includes holding a music information list, as an entity, that is information about promotion videos of hundreds of pieces of music currently broadcast for the current period, and the music information list is held in the RAM 12.

In step S304, from the above-described music information list, only the music information corresponding to the content ID obtained in the above-described step S303 is read out. Next, in the following step S305, a picture is generated as part of the list screen picture 250 of the marked music shown in FIG. 6 using the read music information. During this process, the content of the read music information is reflected in the ranking order within the music information areas 252-1 to 252-5, titles, and artist names. Further, as the drawing process, check marks are attached to all the check boxes 253.

The generated screen picture as mentioned is output as a video output by the process in step S309, so that it is displayed on the monitor apparatus 20 or the like as a screen picture.

On the other hand, if processing proceeds to step S306 because the list screen picture 250 for all music is to be displayed, processing is as follows:

In step S306, the content ID having a mark bit of "1" is obtained by a process similar to the process of step S303.

In this case, in the following step S307, as described earlier, all the music information is read out from the music information list held in the RAM 12. Next, the process in the following step S308 generates a picture as the list screen picture 250 for all music shown in FIG. 7 using the read music information. During this process, the content of the read music information reflects the ranking order, the title, and the artist name within the music information areas 252-1 to 252-5. Further, if a check mark is attached to each check box 253 within the music information areas 252-1 to 252-5, this indicates whether the mark bit corresponding to the content ID corresponding to the music to be displayed at the music information areas 252-1 to 252-5 is "1" or with reference to the marking information again. The check mark is attached only to the music having the mark bit of "1".

As described above, the generated picture is also output as the video output by the process in step S309.

Figure 18:
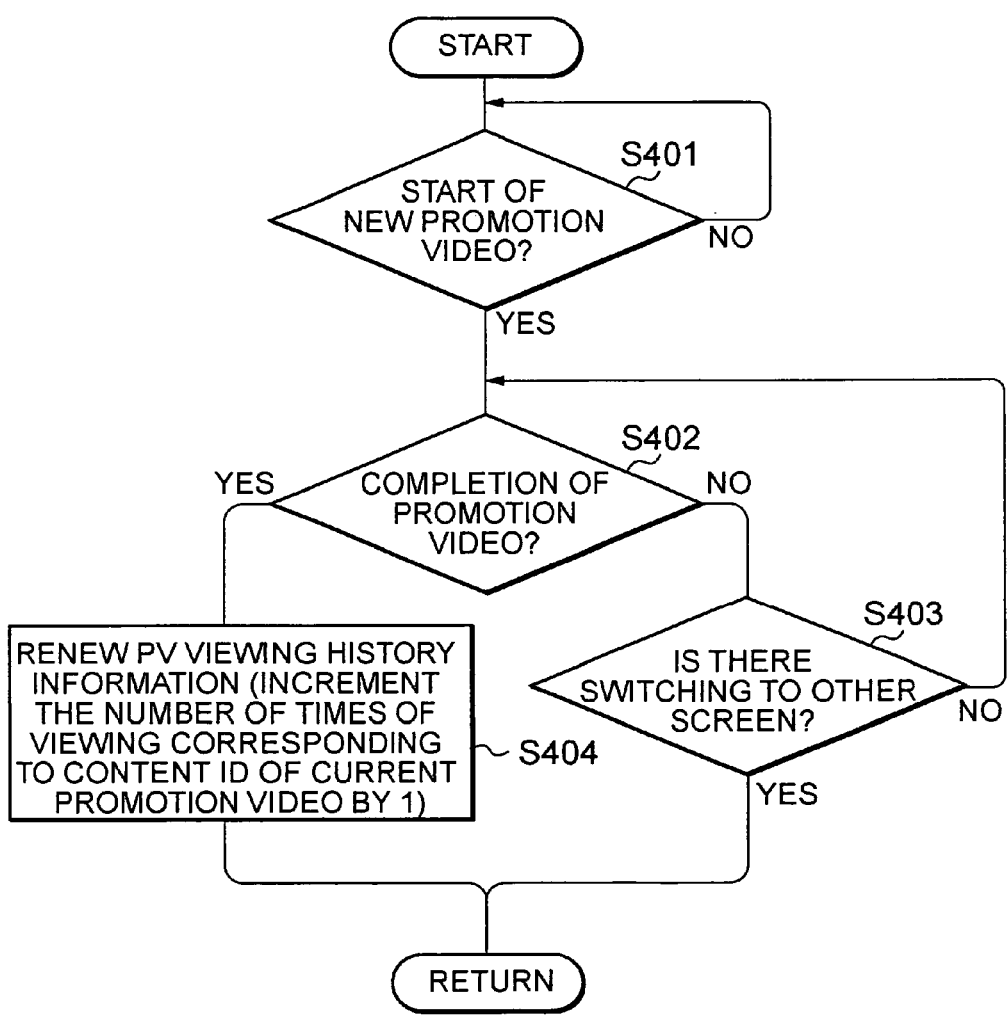
FIG. 18 depicts a flow chart describing a processing operation for renewing PV viewing history information.

FIG. 18 illustrates a processing operation for renewing the PV viewing history information A1 within the user's use history information in the user related information 11a. The PV viewing history information A1 indicates the history regarding whether the user viewed the promotion videos therethrough.

As shown in the drawing, the system controller 9 determines, first, in step S401, whether a display of a new promotion video (music) is started. A change in the promotion videos (music) currently displayed can be detected, for example, by monitoring a change in the content ID transmitted as additional information together with the video/audio data as the promotion video (music). When the content ID changes, and it is determined that the display of the new promotion video is started, processing proceeds to step S402.

In the process of step S402, it is determined whether the promotion video has completed (music), the display of which is started correspondingly to the process in the above-described step S401.

If the promotion video (music) has not completed, it is determined, in step S403, whether processing transitions to another screen picture. Another screen picture, here, includes, for example, the case in which switching to another channel has occurred. Further, though the channel is unchanged, this includes, for example, the case in which it does not become interpreted as viewing a promotion video due to transmission to another predetermined GUI screen picture.

In step S402, if an affirmative result is obtained, the process shown in this drawing is completed and processing proceeds to another desired processing routine. On the other hand, if there is no switching to another screen picture, the processing returns to the process in step S402.

Thus, in step S402, an affirmative result can be obtained if the currently broadcast promotion video is displayed from the start to the end thereof without transition to another screen picture at an intermediate point. If the affirmative result can be obtained as mentioned above, processing proceeds to step S404.

Here, an affirmative result can be obtained which indicates that a user views the promotion video currently broadcast therethrough.

In step S404, the process for renewing the PV viewing history information A1 corresponds to the affirmative result obtained in step S402. For this, first the content ID of the current promotion video is recognized. The current promotion video mentioned here is the promotion video of which completion has been determined in the previous step S403.

Further, the PV viewing history information A1 held in the RAM 11b specifies the PV viewing history information A1 stored in the user's use history information having the user ID of the user set as the current user.

Further, in the PV viewing history information A1 specified as mentioned above, the number of times of viewing corresponding to the content ID of the current promotion video previously recognized is rewritten with the value being incremented.

Next, a description will be provided of a process for changing the display of the cells on the music gauge area 204 on the top screen picture 200 shown in FIG. 4, in accordance with the above-mentioned renewal of the PV viewing history information A1.

Figure 19:
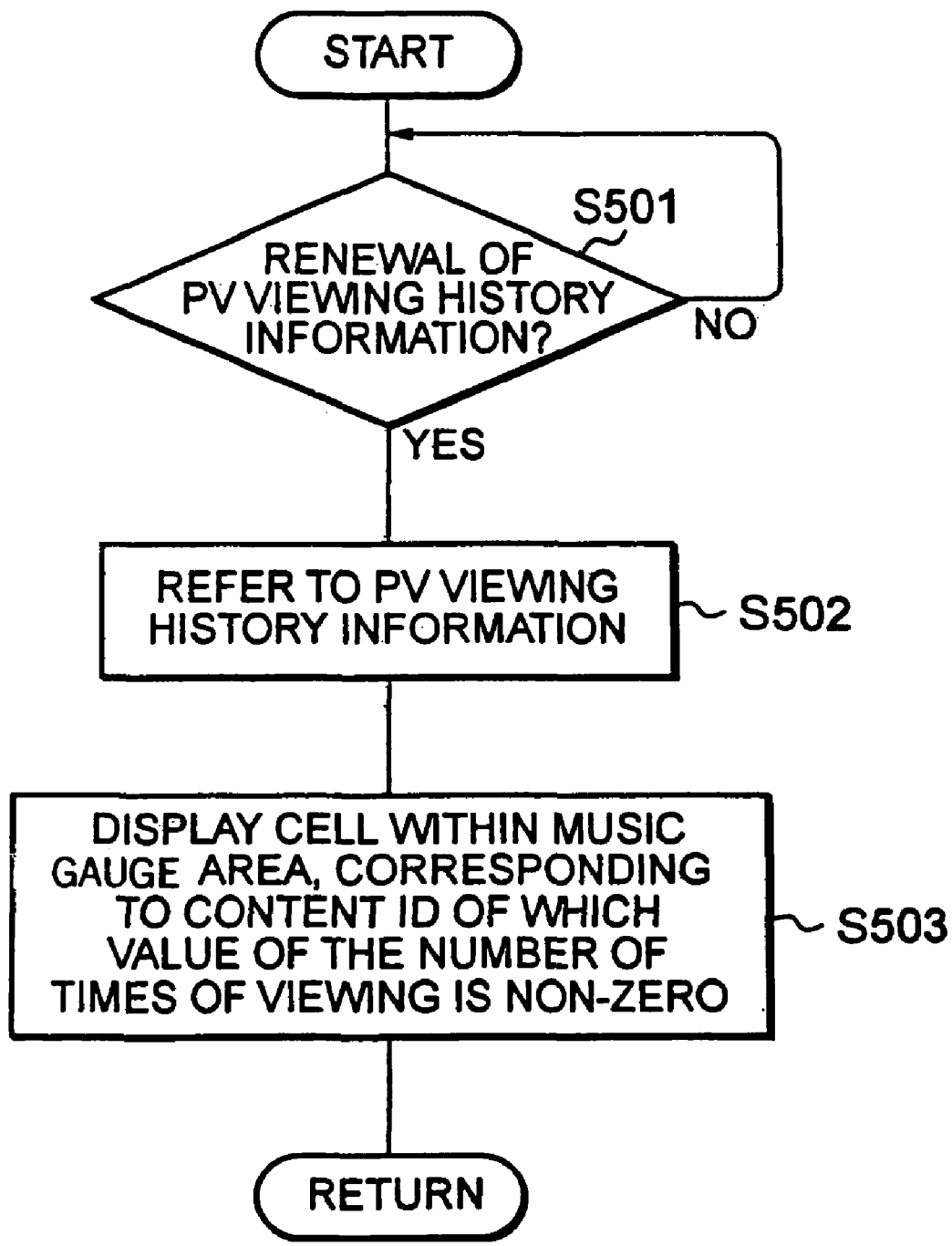
FIG. 19 depicts a flow chart describing a processing operation for a cell display of a music gauge area.

In the process shown in FIG. 19, first, in step S501, a wait period is provided for the renewal of the PV viewing history information A1 of the user set as the current user. When it is determined that the renewal has been performed, processing proceeds to the process in step S502.

In step S502, reference is made to the renewed PV viewing history information A1 is. Then, based on the referred result, in the PV viewing history information A1, the content ID, of which the value of the number of times of viewing is zero, is recognized. After this, the top screen picture 200 is generated to display the cells 204a on the music gauge area 204 corresponding to the recognized content ID.

Further, in the screen picture generation process of the top screen picture 200 in step S103 previously shown in FIG. 15, the display of the cells 204a on the music area 204 is carried out in accordance with the content of the PV viewing history information A1 at that instance. During this process, as one of the processes in step S103, the process from step S502 to S503 mentioned above is executed.

Furthermore, as described with reference to FIG. 1, in broadcasting the promotion videos, the rankings are renewed every week. In the present embodiment, in accordance with the renewal of the rankings, the PV viewing history information A1 and the marking information A2 is cleared. Thus, all of the cells 204a on the music gauge area 204 displayed on the basis of the PV viewing history information A1 are changed to non-display conditions in response to clearance of the PV viewing history information A1.

Next, a description will be provided of an example of a processing operation for providing a service in accordance with the user's use history. As described earlier, if a user completes the picture on the music gauge area 204 by viewing all promotion videos having rankings from the first to hundredth places therethrough, as a reward, the user is provided with the right of to enter to receive a present. Here, will be described processing dealing with this case.

Such a process is provided by displaying the entry button 213 on the top screen picture 200 in accordance with an indication that a user has viewed all promotion videos of the first to hundredth rankings therethrough as described with reference to FIG. 4.

Figure 20:
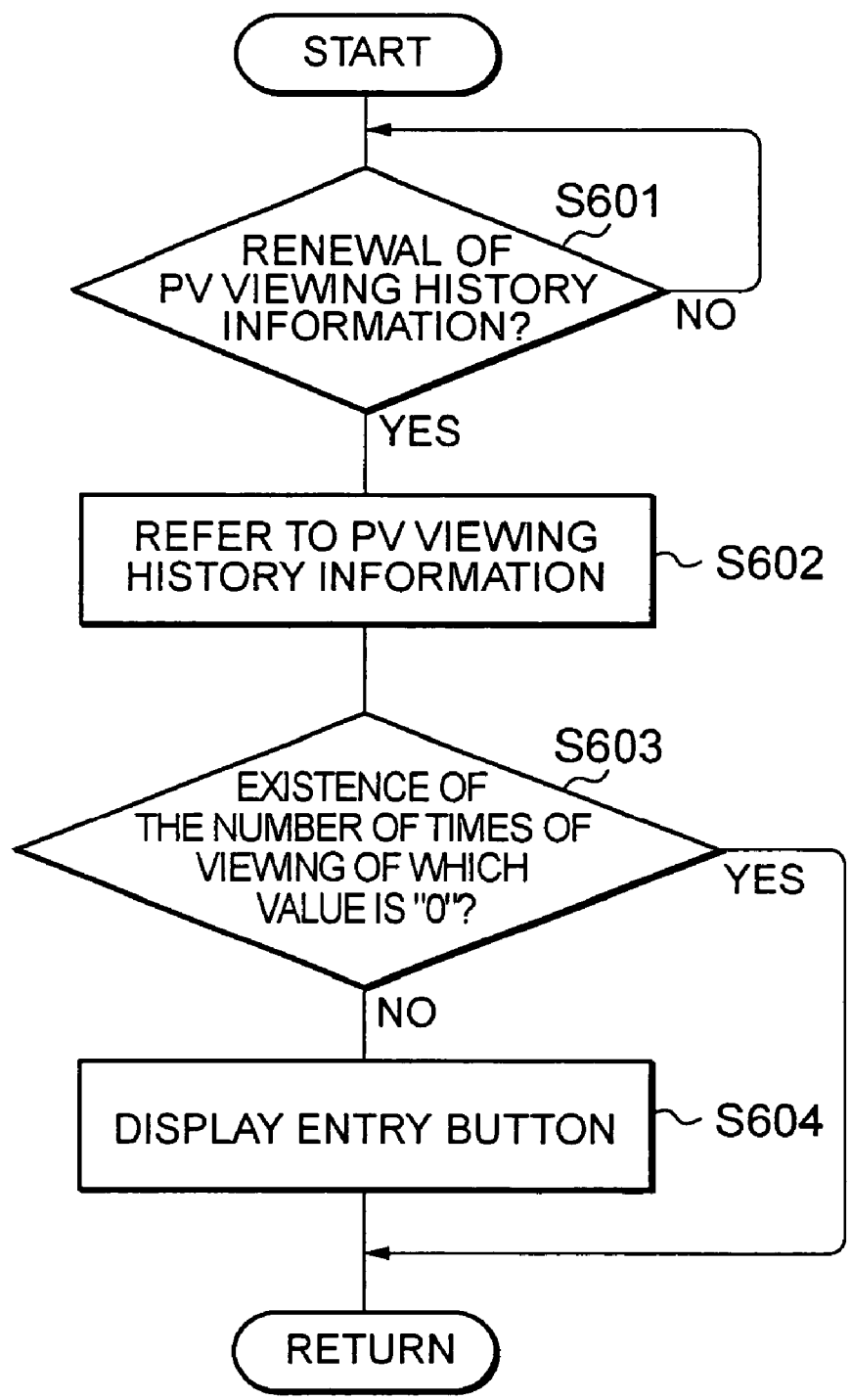
FIG. 20 depicts a flow chart describing an example of a processing operation for providing a present service.

FIG. 20 describes processing for this situation. Also in this case, first, a wait period is provided for the renewal of the PV viewing history information in step S601. Then, if it is determined that the PV viewing history information is renewed, processing moves to a process in step S602.

In step S602, reference is made to the renewed PV viewing history information. In the following step S603, information about the number of times of viewing is evaluated to determine whether a value of "0" exists in the number of times of viewing.

Here, if at least a value of "0" exists in the number of times of viewing, processing shown in this drawing terminates.

On the other hand, if no value of "0" exists in the number of times of viewing (all contents have been viewed of first to hundredth places therethrough), processing proceeds to step S604. In step S604, a screen picture is generated such that, for example, the entry button 213 prepared as an entity of the GUI content is provided on the top screen picture 200. This causes the top screen picture 200 to be displayed, wherein the entry button 213 is newly displayed.

After the display of the entry button 213, if an operation to this entry button 213 is performed, processing jumps to the location where a link is set accordingly. For example, a process for changing the display to the GUI screen picture for the predetermined procedure for an entry for a present is executed in accordance with the script. In other words, the display of the entry button 213 provides a service for entry of a present to users.

Here, a description will be provided of an example of a mode for providing the operation corresponding to the first to third features described as the present embodiment. However, regarding the additional example of the mode in which the display of the GUI screen picture is changed in accordance with the variation of the content of the content as the promotion video as the first feature, it is assumed that there are various possible examples, the description is omitted here.

Then, first, regarding the mode in which the display of the GUI screen picture is varied in accordance with the history of use of the digital satellite broadcast receiver 1 by the user as the second feature, there is further the following example.

First, in one example, the display of the GUI screen picture is changed in accordance with the desires of the user. For example, if the promotion video is broadcast, the artist of which is agreeable to the user, it is considered that the display is changed in order to draw the user's attention to the screen picture. Alternatively, a noticeable display can be carried out just before broadcasting the promotion video, the artist of which is agreeable to the user. Further, the display of live information (concert ticket information) of the artist who is agreeable to the user can be prioritized.

The user's preference for artist can be recognized by reference to the content of, for example, the PV viewing history information A1. In other words, when reference to the content ID of which the number of times of viewing is large, the music information list is searched for the artist corresponding to this content ID. The use of the information of the artist which is preferred by the user, obtained as mentioned above, provides the display of the above-mentioned GUI screen picture.

Further, there is the following possible mode, as the third feature, in which the content of the provided service is changed through the GUI screen picture in accordance with the history of the user's service use.

For example, depending on the operation to the GUI screen picture according to the present embodiment, shopping merchandise other than ticket, CDs, and DVDs is possible. Then, for example, a service can be provided to make free a paper view program relating to the artist of the purchased ticket after the user purchased the ticket. In this case, as a manner of presenting a service on the GUI screen picture, for example, a message "The program OOOO on the channel XX becomes free" or the like and a corresponding button are displayed in accordance with the script of the GUI content. Providing such a service can be achieved by the use, for example, of the service use history information A3.

Further, in the present embodiment, since the user's private information is also stored as the user related information 11a, the display of the GUI screen picture can be changed using the user's private information.

For example, the date of birth of the user is part of the user's private information. Then, fortunetelling can be displayed based on the date of birth of the user. In this case, an entity for displaying fortunetelling as GUI content is prepared. Then, based on the recognized birth date from the user's private information, one of entities for fortunetelling is selected for displaying. For example, on the top screen picture shown in FIG. 4, at the fortunetelling area 214, constellation fortunetelling is displayed for the user set as the current user.

Further, based on the date of birth of the user, on the birthday, a birthday message can be displayed.

Furthermore, because the GUI content performs the GUI screen picture display using the screen picture data of entities, such screen picture data can be changed in accordance with the user's operation. For example, there are prepared as the GUI content a plurality of pieces of the screen picture data of the entity as the background screen picture part 220 that is a background on the top screen picture 200. Then, the user's predetermined operation enables to select the screen picture data of the background screen picture part 220 in accordance with the preference. If the setting information is stored in the user related information in the ROM, after this, the background screen picture part 220 is displayed with the selected background screen picture.

Further, it is also possible to similarly select a template for the entire part of the GUI screen picture.

Further, the digital satellite broadcast receiver 1, according to the present embodiment, includes a drive for reproducing a removable media, and then, the reproduced screen picture data from the inserted removable media is written in the ROM 11. Further, the screen picture data stored in the ROM 11 can be registered as an entity such as the above-mentioned background screen picture part 220 or a GUI template.

Furthermore, similarly, the screen picture data acquired through a network can be registered as an entity such as the above-mentioned background screen picture part 220 or a GUI template.

Further, the present invention is not limited to the above-described embodiments.

For example, the content of the user related information shown in respective drawings are only minimum information for the picture processing or the service providing as described as embodiments. Thus, in fact, a variety of elements of the user related information might be included. In accordance with this, a variety of possible operations can be considered.

Further, the system structure is also not limited to that described in the above-described embodiment. For example, instead of recording the user related information and storing the information in the digital satellite broadcast receiver 1, the user related information can be stored in a server or the like connected to the digital satellite broadcast receiver 1 and then, read out by the digital satellite broadcast receiver 1 to use it. Further, the application of the GUI content is not limited to the BML format, but may be, for example, an application with another markup language.

As described above, the invention is able to change the content of the service provided on the GUI in accordance with the operation or behavior of a user based on the viewing a first content of picture/audio.

This results in a change in the content of the GUI screen picture in accordance with the some action that is caused by the user's reaction to viewing the first content of the picture/audio, so that the user can receive a service according to its viewing behavior. In this respect, the entertainment characteristics, the value of using the system, and the convenience can be increased for the user.

Further, such a change in the GUI content can be obtained by having the receiver execute a process in accordance with the script of the second content (GUI content). In other words, the process in the receiver can provide the change in the GUI adaptively in response to a change of the content of the first content.

This indicates that it is sufficient that the broadcast side produces the second content corresponding to the application data to obtain a desired operation of the GUI, but does not indicate that it is unnecessary to edit the first content, for example, corresponding to the general broadcast program. It is not easy to edit the first content, for example, because it includes an editing process for the video signal. Thus, it is advantageous in providing the above-described change in the picture by editing or preparing the second content.

The invention claimed is:

1. A transmission apparatus, comprising:
   first production means for producing a first content of a video signal and/or an audio signal;
   second production means for producing a second content corresponding to the first content, the second content including a script for outputting a graphical user interface, and the script includes a description for causing a reception apparatus to execute:
   a process for producing use history information including a predetermined content in accordance with a use result related to the use by a user of the first content in the reception apparatus, the use history information having a hit chart rankings of the first content and
   a process for changing the graphical user interface based on the use history information so as to change a service to be provided with an operation to a user interface screen picture; and sending means for providing, as a broadcast, a transmission output of the second content in combination with the first content, a stile of the graphical user interface being adaptively varied by the reception apparatus according to the first content and a viewing history of the first content, the viewing history of the first content being stored in the reception apparatus, the reception apparatus changes the graphical user interface relating to the first content in accordance with the second content and the viewing history, the graphical user interface including a plurality of colored buttons, each button matching a correspondingly colored button on a remote control unit, and each button being selectable through activation of the correspondingly colored button on the remote control unit, at least one button being enabled and at least one button being disabled, for each button that is enabled the graphical user interface including in the button's proximity text descriptive of the button's function, and for each button that is disabled the graphical user interface including no text in the button's proximity wherein in response to user selection of one of the plurality of colored buttons on the graphical user interface while a promotion video of the first content is being displayed on the graphical user interface, a check mark is registered at the reception apparatus and a mark bit is set to "1" in the hit chart rankings, and wherein the check mark is automatically displayed in proximity to the selected color button on the graphical user interface in response to detecting a succeeding broadcast of the promotion video of the first content.

2. The transmission apparatus according to claim 1, wherein the first content is compressed and coded, and transmitted.

3. The transmission apparatus according to claim 1, wherein the second content is transmitted as data broadcast.

4. A reception apparatus, comprising:

reception means for receiving a first content including a video signal and/or an audio signal transmitted as a broadcast and a second content corresponding to the first content, the second content including a script for outputting a graphical user interface, and the script including a description for causing the reception apparatus to execute:

a process for producing use history information including a predetermined content in accordance with a use result related to the use by a user of the first content in the reception apparatus, the use history information having a hit chart rankings of the first content and a process for changing the graphical user interface based on the use history information so as to change a service to be provided with an operation to a user interface screen picture; and user interface forming means for forming a graphical user interface to be output together with a picture as the first content in accordance with the script, for producing and storing the use history information in accordance with the use result, and for executing, in accordance with the script, a stile of the graphical user interface being adaptively varied by the reception apparatus according to the first content and a viewing history of the first content, the viewing history of the first content being stored in the reception apparatus, the reception apparatus changes the graphical user interface relating to the first content in accordance with the second content and the viewing history, the graphical user interface including a plurality of colored buttons, each button matching a correspondingly colored button on a remote control unit, and each button being selectable through activation of the correspondingly colored button on the remote control unit, at least one button being enabled and at least one button being disabled, for each button that is enabled the graphical user interface including in the button's proximity text descriptive of the button's function, and for each button that is disabled the graphical user interface including no text in the button's proximity, wherein in response to user selection of one of the plurality of colored buttons on the graphical user interface while a promotion video of the first content is being displayed on the graphical user interface, a check mark is registered at the reception apparatus and a mark bit is set to "1" in the hit chart rankings, and wherein the check mark is automatically displayed in proximity to the selected color button on the graphical user interface in response to detecting a succeeding broadcast of the promotion video of the first content.

5. The reception apparatus according to claim 4, wherein the first content is compressed and coded, and transmitted.

6. The reception apparatus according to claim 4, wherein the second content is transmitted as data broadcast.

7. The reception apparatus according to claim 4, wherein the user is allowed to perform operations to the user interface picture.

8. The reception apparatus according to claim 4, wherein a mark operation is performed on a selected one of the first content; and the graphical user interface changes in response to the mark operation.

9. A transmission apparatus, comprising:

first production means for producing a first content of a video signal and/or the audio signal;

second production means for producing a second content corresponding to the first content, the second content including a script for outputting a graphical user interface, and the script including a description for causing a reception apparatus to execute a process for changing a picture content in the graphical user interface in accordance with a change in the content of the first content and to execute a process for producing use history information, the use history information having a hit chart rankings of the first content; and sending means for providing, as a broadcast, a transmission output of the second content combined with the first content, a stile of the graphical user interface being adaptively varied by the reception apparatus according to the first content and a viewing history of the first content, the viewing history of the first content being stored in the reception apparatus, the reception apparatus changes the graphical user interface relating to the first content in accordance with the second content and the viewing history, the graphical user interface including a plurality of colored buttons, each button matching a correspondingly colored button on a remote control unit, and each button being selectable through activation of the correspondingly colored button on the remote control unit, at least one button being enabled and at least one button being disabled, for each button that is enabled the graphical user interface including in the button's proximity text descriptive of the button's function, and for each button that is disabled the graphical user interface including no text in the button's proximity, wherein in response to user selection of one of the plurality of colored buttons on the graphical user interface while a promotion video of the first content is being displayed on the graphical user interface, a check mark is registered at the reception apparatus and a mark bit is set to "1" in the hit chart rankings, and wherein the check mark is automatically displayed in proximity to the selected color button on the graphical user interface in response to detecting a succeeding broadcast of the promotion video of the first content.

10. A reception apparatus, comprising:

reception means for receiving a first content including a video signal and/or an audio signal transmitted as a broadcast and a second content corresponding to the first content, the second content including a script for outputting a graphical user interface, and the script including a description for causing the reception apparatus to execute a process for changing a picture content in the graphical user interface in accordance with a change in the content of the first content and to execute a process for producing use history information, the use history information having a hit chart rankings of the first content; and interface forming means for forming the graphical user interface so as to change the picture content in accordance with the change in the first content in accordance with the script, and for forming the user interface picture to be output together with a picture as the first content in accordance with the script, a stile of the graphical user interface being adaptively varied by the reception apparatus according to the first content and a viewing history of the first content, the viewing history of the first content being stored in the reception apparatus, the reception apparatus changes the graphical user interface relating to the first content in accordance with the second content and the viewing history, the graphical user interface including a plurality of colored buttons, each button matching a correspondingly colored button on a remote control unit, and each button being selectable through activation of the correspondingly colored button on the remote control unit, at least one button being enabled and at least one button being disabled, for each button that is enabled the graphical user interface including in the button's proximity text descriptive of the button's function, and for each button that is disabled the graphical user interface including no text in the button's proximity, wherein in response to user selection of one of the plurality of colored buttons on the graphical user interface while a promotion video of the first content is being displayed on the graphical user interface, a check mark is registered at the reception apparatus and a mark bit is set to "1" in the hit chart rankings, and wherein the check mark is automatically displayed in proximity to the selected color button on the graphical user interface in response to detecting a succeeding broadcast of the promotion video of the first content.

11. A transmission apparatus, comprising:

first production means for producing a first content of a video signal and/or an audio signal;

second production means for producing a second content corresponding to the first content, the second content including a script for outputting a graphical user interface and the script including a description for causing a reception apparatus to execute:

a process for producing use history information including a predetermined content in accordance with a use result by a user of the first content in the reception apparatus the use history information having a hit chart rankings of the first content; and a process for changing a picture content in the graphical user interface based on the use history information; and sending means for providing, as a broadcast, a transmission output of the second content combined with the first content, a stile of the graphical user interface being adaptively varied by the reception apparatus according to the first content and a viewing history of the first content, the viewing history of the first content being stored in the reception apparatus, the reception apparatus changes the graphical user interface relating to the first content in accordance with the second content and the viewing history, the graphical user interface including a plurality of colored buttons, each button matching a correspondingly colored button on a remote control unit, and each button being selectable through activation of the correspondingly colored button on the remote control unit, at least one button being enabled and at least one button being disabled, for each button that is enabled the graphical user interface including in the button's proximity text descriptive of the button's function, and for each button that is disabled the graphical user interface including no text in the button's proximity, wherein in response to user selection of one of the plurality of colored buttons on the graphical user interface while a promotion video of the first content is being displayed on the graphical user interface, a check mark is registered at the reception apparatus and a mark bit is set to "1" in the hit chart rankings, and wherein the check mark is automatically displayed in proximity to the selected color button on the graphical user interface in response to detecting a succeeding broadcast of the promotion video of the first content.

12. A reception apparatus comprising:

reception means for receiving a second content for outputting a graphical user interface, the second content including a script having a description for causing the reception apparatus to execute:

a process for producing a first content of a video signal and/or an audio signal transmitted as a broadcast and use history information of a predetermined content in accordance with the use result related to the use by a user of the first content in the reception apparatus use history information having a hit chart rankings of the first content and a process for changing a picture content on the graphical user interface based on the use history information; and interface forming means for forming a graphical user interface to be output with a picture as a first content in accordance with the script, for producing and storing use history information according to the use result, and for forming the graphical user interface to change the picture content based on the stored use history information, a stile of the graphical user interface being adaptively varied by the reception apparatus according to the first content and a viewing history of the first content, the viewing history of the first content being stored in the reception apparatus, the reception apparatus changes the graphical user interface relating to the first content in accordance with the second content and the viewing history, the graphical user interface including a plurality of colored buttons, each button matching a correspondingly colored button on a remote control unit, and each button being selectable through activation of the correspondingly colored button on the remote control unit, at least one button being enabled and at least one button being disabled, for each button that is enabled the graphical user interface including in the button's proximity text descriptive of the button's function, and for each button that is disabled the graphical user interface including no text in the button's proximity, wherein in response to user selection of one of the plurality of colored buttons on the graphical user interface while a promotion video of the first content is being displayed on the graphical user interface, a check mark is registered at the reception apparatus and a mark bit is set to "1" in the hit chart rankings, and wherein the check mark is automatically displayed in proximity to the selected color button on the graphical user interface in response to detecting a succeeding broadcast of the promotion video of the first content.

13. A transmission apparatus, comprising:

first content producer operable to produce a first content of a video signal and/or an audio signal;

second content producer operable to produce a second content corresponding to the first content, the second content including a script for outputting a graphical user interface, and the script includes a description for causing a reception apparatus to execute:

a process for producing use history information including a predetermined content in accordance with a use result related to the use by a user of the first content in the reception apparatus, after "apparatus," the use history information having a hit chart rankings of the first content, and a process for changing the graphical user interface based on the use history information so as to change a service to be provided with an operation to a user interface screen picture; and transmitter operable to provide, as a broadcast, a transmission output of the second content in combination with the first content, a stile of the graphical user interface being adaptively varied by the reception apparatus according to the first content and a viewing history of the first content, the viewing history of the first content being stored in the reception apparatus, the reception apparatus changes the graphical user interface relating to the first content in accordance with the second content and the viewing history, the graphical user interface including a plurality of colored buttons, each button matching a correspondingly colored button on a remote control unit, and each button being selectable through activation of the correspondingly colored button on the remote control unit, at least one button being enabled and at least one button being disabled, for each button that is enabled the graphical user interface including in the button's proximity text descriptive of the button's function, and for each button that is disabled the graphical user interface including no text in the button's proximity, wherein in response to user selection of one of the plurality of colored buttons on the graphical user interface while a promotion video of the first content is being displayed on the graphical user interface, a check mark is registered at the reception apparatus and a mark bit is set to "1" in the hit chart rankings, and wherein the check mark is automatically displayed in proximity to the selected color button on the graphical user interface in response to detecting a succeeding broadcast of the promotion video of the first content.

14. A reception apparatus, comprising:

receiver operable to receive a first content including a video signal and/or an audio signal transmitted as a broadcast and a second content corresponding to the first content, the second content including a script for outputting a graphical user interface, and the script including a description for causing the reception apparatus to execute:

a process for producing use history information including a predetermined content in accordance with a use result related to the use by a user of the first content in the reception apparatus the use history information having a hit chart rankings of the first content, and a process for changing the graphical user interface based on the use history information so as to change a service to be provided with an operation to a user interface screen picture; and user interface forming device operable to form a graphical user interface to be output together with a picture as the first content in accordance with the script, to produce and store the use history information, and to execute, in accordance with the script, a process for changing the graphical user interface based on the use history information so as to change the service to be provided with the operation to the user interface screen picture, a stile of the graphical user interface being adaptively varied by the reception apparatus according to the first content and a viewing history of the first content, the viewing history of the first content being stored in the reception apparatus, the reception apparatus changes the graphical user interface relating to the first content in accordance with the second content and the viewing history, the graphical user interface including a plurality of colored buttons, each button matching a correspondingly colored button on a remote control unit, and each button being selectable through activation of the correspondingly colored button on the remote control unit, at least one button being enabled and at least one button being disabled, for each button that is enabled the graphical user interface including in the button's proximity text descriptive of the button's function, and for each button that is disabled the graphical user interface including no text in the button's proximity, wherein in response to user selection of one of the plurality of colored buttons on the graphical user interface while a promotion video of the first content is being displayed on the graphical user interface, a check mark is registered at the reception apparatus and a mark bit is set to "1" in the hit chart rankings, and wherein the check mark is automatically displayed in proximity to the selected color button on the graphical user interface in response to detecting a succeeding broadcast of the promotion video of the first content.

15. A transmission apparatus, comprising:

first content producer operable to produce a first content of a video signal and/or the audio signal;

second content producer operable to produce a second content corresponding to the first content, the second content including a script for outputting a graphical user interface, and the script including a description for causing a reception apparatus to execute a process for changing a picture content in the graphical user interface in accordance with a change in the content of the first content and to execute a process for producing use history information, the use history information having a hit chart rankings of the first content; and transmitter operable to provide, as a broadcast, a transmission output of the second content combined with the first content, a stile of the graphical user interface being adaptively varied by the reception apparatus according to the first content and a viewing history of the first content, the viewing history of the first content being stored in the reception apparatus, the reception apparatus changes the graphical user interface relating to the first content in accordance with the second content and the viewing history, the graphical user interface including a plurality of colored buttons, each button matching a correspondingly colored button on a remote control unit, and each button being selectable through activation of the correspondingly colored button on the remote control unit, at least one button being enabled and at least one button being disabled, for each button that is enabled the graphical user interface including in the button's proximity text descriptive of the button's function, and for each button that is disabled the graphical user interface including no text in the button's proximity, wherein in response to user selection of one of the plurality of colored buttons on the graphical user interface while a promotion video of the first content is being displayed on the graphical user interface, a check mark is registered at the reception apparatus and a mark bit is set to "1" in the hit chart rankings, and wherein the check mark is automatically displayed in proximity to the selected color button on the graphical user interface in response to detecting a succeeding broadcast of the promotion video of the first content.

16. A reception apparatus, comprising:

receiver operable to receive a first content including a video signal and/or an audio signal transmitted as a broadcast and a second content corresponding to the first content, the second content including a script for outputting a graphical user interface, and the script including a description for causing the reception apparatus to execute a process for changing a picture content in the graphical user interface in accordance with a change in the content of the first content and to execute a process for producing use history information, the use history information having a hit chart rankings of the first content; and interface forming device operable to form the graphical user interface so as to change the picture content in accordance with the change in the first content in accordance with the script, and to form the user interface picture to be output together with a picture as the first content in accordance with the script, a stile of the graphical user interface being adaptively varied by the reception apparatus according to the first content and a viewing history of the first content, the viewing history of the first content being stored in the reception apparatus, the reception apparatus changes the graphical user interface relating to the first content in accordance with the second content and the viewing history, the graphical user interface including a plurality of colored buttons, each button matching a correspondingly colored button on a remote control unit, and each button being selectable through activation of the correspondingly colored button on the remote control unit, at least one button being enabled and at least one button being disabled, for each button that is enabled the graphical user interface including in the button's proximity text descriptive of the button's function, and for each button that is disabled the graphical user interface including no text in the button's proximity, wherein in response to user selection of one of the plurality of colored buttons on the graphical user interface while a promotion video of the first content is being displayed on the graphical user interface, a check mark is registered at the reception apparatus and a mark bit is set to "1" in the hit chart rankings, and wherein the check mark is automatically displayed in proximity to the selected color button on the graphical user interface in response to detecting a succeeding broadcast of the promotion video of the first content.

17. A transmission apparatus, comprising:

first content producer operable to produce a first content of a video signal and/or an audio signal;

second content producer operable to produce a second content corresponding to the first content, the second content including a script for outputting a graphical user interface and the script including a description for causing a reception apparatus to execute:

a process for producing use history information including a predetermined content in accordance with a use result by a user of first content in the reception apparatus the use history information having a hit chart rankings of the first content; and a process for changing a picture content in the graphical user interface based on the use history information; and transmission device operable to provide, as a broadcast, a transmission output of the second content combined with the first content, a stile of the graphical user interface being adaptively varied by the reception apparatus according to the first content and a viewing history of the first content, the viewing history of the first content being stored in the reception apparatus, the reception apparatus changes the graphical user interface relating to the first content in accordance with the second content and the viewing history, the graphical user interface including a plurality of colored buttons, each button matching a correspondingly colored button on a remote control unit, and each button being selectable through activation of the correspondingly colored button on the remote control unit, at least one button being enabled and at least one button being disabled, for each button that is enabled the graphical user interface including in the button's proximity text descriptive of the button's function, and for each button that is disabled the graphical user interface including no text in the button's proximity, wherein in response to user selection of one of the plurality of colored buttons on the graphical user interface while a promotion video of the first content is being displayed on the graphical user interface, a check mark is registered at the reception apparatus and a mark bit is set to "1" in the hit chart rankings, and wherein the check mark is automatically displayed in proximity to the selected color button on the graphical user interface in response to detecting a succeeding broadcast of the promotion video of the first content.

18. A reception apparatus comprising:

receiver operable to receive a second content for outputting a graphical user interface, the second content including a script having a description for causing the reception apparatus to execute:

a process for producing a first content of a video signal and/or an audio signal transmitted as a broadcast and use history information of a predetermined content in accordance with the use result related to the use by a user of the first content in the reception apparatus the use history information having a hit chart rankings of the first content, and a process for changing a picture content on the graphical user interface based on the use history information; and interface forming device operable to form a graphical user interface to be output with a picture as a first content in accordance with the script, to produce and store use history information according to the use result, and to form the graphical user interface to change the picture content based on the stored use history information, a stile of the graphical user interface being adaptively varied by the reception apparatus according to the first content and a viewing history of the first content, the viewing history of the first content being stored in the reception apparatus, the reception apparatus changes the graphical user interface relating to the first content in accordance with the second content and the viewing history, the graphical user interface including a plurality of colored buttons, each button matching a correspondingly colored button on a remote control unit, and each button being selectable through activation of the correspondingly colored button on the remote control unit, at least one button being enabled and at least one button being disabled, for each button that is enabled the graphical user interface including in the button's proximity text descriptive of the button's function, and for each button that is disabled the graphical user interface including no text in the button's proximity, wherein in response to user selection of one of the plurality of colored buttons on the graphical user interface while a promotion video of the first content is being displayed on the graphical user interface, a check mark is registered at the reception apparatus and a mark bit is set to "1" in the hit chart rankings, and wherein the check mark is automatically displayed in proximity to the selected color button on the graphical user interface in response to detecting a succeeding broadcast of the promotion video of the first content.

* * * * *